(12) United States Patent
Romano et al.

(10) Patent No.: US 6,236,895 B1
(45) Date of Patent: May 22, 2001

(54) REFERENCE ESTIMATOR IN A DISCRETE-TIME SLIDING MODE CONTROLLER

(75) Inventors: Paul M. Romano; Louis Supino, both of Boulder; Christopher T. Settje, Westminster, all of CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/145,525

(22) Filed: Sep. 2, 1998

(51) Int. Cl.[7] .................................................. G05B 13/02
(52) U.S. Cl. ........................ 700/28; 700/17; 318/568.18
(58) Field of Search .................................. 700/71, 40, 78, 700/45, 28, 77; 360/78.09, 78.06; 438/15; 318/568.22, 802, 135

(56) References Cited

U.S. PATENT DOCUMENTS

| | | | |
|---|---|---|---|
| 3,701,889 | 10/1972 | Barron et al. | 235/151.1 |
| 4,679,103 | 7/1987 | Workman | 360/77 |
| 4,713,596 | 12/1987 | Bose | 318/802 |
| 5,249,117 | 9/1993 | Greenough et al. | 700/30 |
| 5,276,387 | 1/1994 | Gamble | 318/135 |
| 5,285,379 | 2/1994 | Gamble | 700/40 |
| 5,341,078 | 8/1994 | Torii et al. | 318/568.22 |
| 5,345,348 | 9/1994 | Suzuki | 360/78.07 |
| 5,442,270 | 8/1995 | Tetsuaki | 318/568.22 |
| 5,510,939 * | 4/1996 | Lewis | 360/78.09 |
| 5,699,207 * | 12/1997 | Supino et al. | 360/78.09 |
| 5,781,365 * | 7/1998 | Romano et al. | 360/78.06 |
| 5,825,582 * | 10/1998 | Supino et al. | 360/78.06 |
| 5,901,010 * | 5/1999 | Glover et al. | 360/78 |

FOREIGN PATENT DOCUMENTS

| | | |
|---|---|---|
| 44 05 087 | 8/1994 | (DE) . |
| 0 013 326 | 7/1980 | (EP) . |

OTHER PUBLICATIONS

Katsuhisa Furuta, "Sliding Mode Control of a Discrete System", *Systems & Control Letters,* vol. 14, No. 2, Feb. 1990.

(List continued on next page.)

*Primary Examiner*—William Grant
*Assistant Examiner*—Kidesi Bahta
(74) *Attorney, Agent, or Firm*—Howard H. Sheerin; Dan A. Shifrin

(57) ABSTRACT

A discrete-time sliding mode controller (SMC) controls the motion of mechanical apparatus such as a read head in a disk storage system. The overall control effort is generated by combining a linear control effort with a discrete-time sliding mode control effort generated by switching between gains in order to drive the system's phase states toward a sliding line trajectory. An estimate of a reference is generated and added to the control effort, thereby providing an approximation of the derivative of the reference signal. Estimating the reference signal may be performed by various methods, depending on whether the reference is known, unknown but repeatable, or completely unknown and non-repeatable. A least-mean-square (LMS) algorithm is employed to estimate the reference signal by computing coefficients of a function which minimizes a particular system parameter. If the reference is an unknown, repeatable sinusoid, such as the runout signal in a disk storage device, the coefficients of a synthesized sinusoid may be determined by minimizing the position error phase state. Alternatively, the coefficients of the synthesized sinusoid may be determined by minimizing the sliding mode variable $\sigma_k$ which defines the position of the system phase states relative to the sliding line. For references that are unknown and non-repeatable, an estimate of the derivative of the reference signal is computed, weighted, and added to weighted derivatives of the estimate, where the weights or coefficients of this function are also determined by minimizing the sliding mode variable $\sigma_k$.

18 Claims, 24 Drawing Sheets

OTHER PUBLICATIONS

J. C. Hung, "Chattering Handling for Variable Structure Control Systems", *Proceedings of the IECON '93, vol. 3, 1993.*

Raymond A. DeCarlo, Stanislaw H. Zak, and Gregory Mathews, "Variable Structure Control of Nonlinear Multivaribale Systems: A Tutorial", *Proceedings of the IEEE*, vol. 76, No. 3, Mar. 1988.

V. I. Utkin, "Discontinous Control System: State of Art In Theory and Applications", *Automatic Control World Congress* 1987, vol. 1.

Weibing Gao and James C. Hung, "Variable Structure control of Nonlinear Systems: A New Approach", *IEEE Trans. on Industrial Electronics*, vol. 40, No. 1, Feb. 1993.

M. A. El–Sharkawi, "Development and Implementation of High Performance Variable Structure Tracking Control for Brushless Motors", *IEEE/PES 1990 Summer Meeting*, Mineapolis, minnesota, Jul. 15–19, 1990.

G. C. Verghese, B. Fernandez R., and J. K. Hedrick, "Stable, Robust Tracking by Sliding Mode Control", *Systems & Control Letters*, vol. 10, 1988.

Kar–Keung D. Young and Harry G. Kwatny, "Variable Structure Servomechanism Design and Applications to Overspeed Protection Control", *1982 International Federation of Automatic Control.*

B. K. Bose, "Sliding Mode Control of Induction Motor", CH2207–9/85/0000–0479 IEEE (1985).

"Sliding Mode Control For Arrivals and Small Movement" IBM Technical Disclosure Bulletin, vol. 23, No. 4, (1990).

Weibing Gao, Yufu Wang, and Abdollah Homaifa, "Discrete–Time Variable Structure Control Systems", *IEEE Trans. on Industrial Electronics*, vol. 42, No. 2, Apr. 1995.

John Y. Hung, Weibing Gao, and James C. Hung, "Variable Structure Control: A Survey", IEEE Trans. on Industrial Electronics, vol. 40, No. 1, Feb. 1993.

Yasuda et al., "Controller Using Sliding Mode Control", Patent Abstracts of Japan, vol. 12, No. 411.

Jean–Jacques E. Slotine, "Sliding controller design for non-–linear systems", *Int. J. Control,* vol. 40, No. 2, 1984, pp. 421–434.

G. Ambrosino, G. Celentano, F. Garofalo, "Variable structure model reference adaptive control system", *Int. J. Control*, vol. 39, No. 6, 1984, pp. 1339–1349.

Chandrasekhar Namuduri and Paresh C. Sen, "A Servo-–Control System Using a Self–Conrolled Synchronous Motor (SCSM) With Sliding Mode Controller", *IEEE Trans. on Industry Applications*, vol. IA–23, No. 2, Mar./Apr., 1987.

F. Harashima, H. Hashimoto, and S. Kondo, "MOSFET Converter–Fed Position Servo System with Sliding Mode Control", *IEEE Transactions on Industrial Electronics*, vol. IE–32, No. 3, Aug. 1985, pp. 238–244.

C. Denise Mee, Eric D. Daniel, *"Magentic Recording vol. II: Computer Data Storage"*, McGraw–Hill, 1988, pp. 53–70.

Andrzej Bartoszewicz, "Remarks on 'Discrete–Time Variable Structure Control Systems", *IEEE Transactions on Industrrial Electronics*, vol. 43, No. 1, Feb. 1996.

U.S. application No. 08/943,997, filed Oct. 3, 1997.

S. Weerasooriya and T.S. Low, "Adaptive Sliding Mode Control of a Disk Drive Actuator", *Asia–Pacific Workshop on Advances in Motion Control Proceedings*, Singapore, Jul. 15–16, 1993, IEEE, NY, USA, pp. 177–182.

* cited by examiner

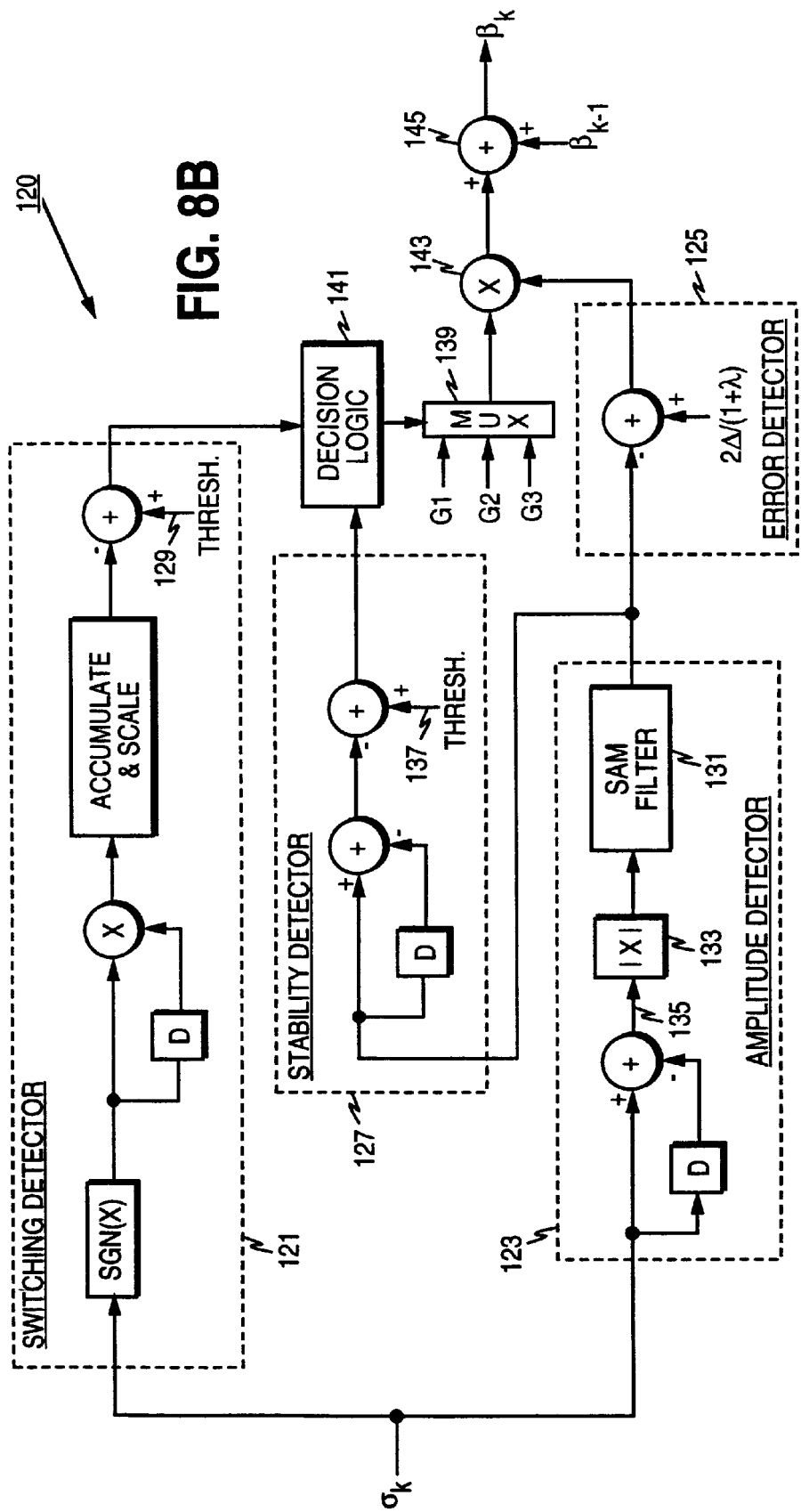

REFERENCE ESTIMATOR IN A DISCRETE-TIME SLIDING MODE CONTROLLER

RELATED APPLICATIONS

This application is a related to U.S. patent application Ser. No. 08/943,997 entitled "Improved Chatter Reduction in Sliding Mode Control of a Disk Drive Actuator" which is hereby incorporated by reference.

FIELD OF INVENTION

The present invention relates to control systems technology, and more specifically, to a discrete-time sliding mode controller and method and apparatus for estimating a pseudo derivative reference signal for use in generating the control effort.

BACKGROUND OF THE INVENTION

Sliding mode control (SMC) is a relatively new development in control systems which was first developed in Russia in the 1950's. It is a subclass of Variable Structure Control (VSC), control systems that switch between structures in a non-linear manner in order to drive phase states of the system toward a phase plane trajectory. The phase states of the system include the position error and its derivatives (velocity, acceleration, etc.); the location of the phase states within a phase plane define the state of the system at any given time, and the movement of the phase states through the phase plane is referred to as the phase state trajectory.

When the SMC is operating in a first structure, the phase states follow a first phase state trajectory, and when the SMC is operating in a second structure the phase states follow a second phase state trajectory. By switching between the first and second structures, the phase states are driven toward a third phase state trajectory, referred to as the sliding line (or hyperplane for higher order systems), defined within the phase plane where the first and second phase state trajectories intersect in opposite directions. The switching action is controlled by the location of the phase states relative to the sliding line; when the phase states cross the sliding line while following the first phase state trajectory, the system switches to the second structure to drive the phase states toward the sliding line by following the second phase state trajectory. In this manner, the phase states continuously switch across the sliding line as they follow the sliding line toward the origin of the phase plane (i.e., sliding mode). SMC has the advantage in that the closed loop response is defined by parameters in the controller and it is substantially insensitive to parameter variations in the plant and external load disturbances.

Initially, SMC systems were developed and implemented in continuous-time wherein the phase states are continuously monitored such that the system switches structures instantaneously when the phase states cross the sliding line. An inherent problem with this approach is that the continuous switching action may induce undesirable noise in the system (electrical and acoustic) and it may excite modelled (as well as unmodelled) system dynamics. The above referenced co-pending patent application entitled "Improved Chatter Reduction in Sliding Mode Control of a Disk Drive Actuator" discloses a method for reducing the amount of switching noise by defining a boundary layer around the sliding line and switching between structures only when the phase states exceed the boundary layer. Although this technique reduces the switching noise, there are other inherent problems with continuous-time SMC. Namely, to achieve the desired robustness to parameter variations and external disturbances, it can require gains in the individual structures that exceed the control effort limitations (e.g., exceed the available drive current).

Discrete-time SMC is a more recent development which addresses the drawbacks of continuous-time SMC by combining a conventional linear control effort with a discrete-time sliding mode control effort. This approach is discussed by Weibing Gao in "Discrete-Time Variable Structure Control Systems," *IEEE Transactions on Industrial Electronics*, Vol. 42, No. Apr. 2, 1995. With discrete-time SMC, the phase states are monitored in discrete-time and the system switches between structures at the sampling rate rather than continuously. Thus, there is an inherent boundary layer about the sliding line with a width defined by the sampling period, as well as other parameters of the controller. Rather than switch continuously such that the phase states "slide" along the sliding line, the phase states switch across the sliding line in a zigzag manner while sliding toward the origin of the phase plane. Another characteristic of discrete-time SMC is that nominally the phase states will cross the sliding line at every sampling period, and the absolute magnitude of the distance between the phase states and the sliding line will remain within the inherent boundary layer.

The position error phase state is typically generated by subtracting an estimated position from a reference position. In disk storage systems, for example, the position error is generated as the difference between the centerline of a target track and the estimated position of the read head. Although the reference position (the track centerline) is static with respect to the disk, the eccentricities of the disk will induce a perturbation into the reference position with respect to the read head, particularly in optical disk storage devices where the media is removable. This perturbation signal is referred to as "runout" and it is typically dominated by a fundamental sinusoid at a frequency equal to the angular velocity of the disk, and a linear combination of the fundamental harmonics. The discrete-time sliding mode control effort is a function of a psuedo derivative of the reference (PDR) signal; it is necessary to generate an estimate of the PDR signal in order to implement a discrete-time sliding mode controller.

SUMMARY OF THE INVENTION

A discrete-time sliding mode controller (SMC) is disclosed for controlling the motion of mechanical apparatus such as a read head in a disk storage system. The overall control effort is generated by combining a linear control effort with a discrete-time sliding mode control effort generated by switching between gains in order to drive the system's phase states toward a sliding line trajectory. An estimate of the reference is generated and added to the control effort, thereby providing an approximation of the derivative of the reference signal. Various methods are disclosed for estimating the reference signal depending on whether the reference is known, unknown but repeatable, or completely unknown and non-repeatable. A least-mean-square (LMS) algorithm is employed to estimate the reference signal by computing coefficients of a function which minimizes a particular system parameter. In one embodiment, the reference is an unknown, repeatable sinusoid, such as the runout signal in a disk storage device, and the coefficients of a synthesized sinusoid are determined by minimizing the position error phase state. In a similar embodiment, the coefficients of the synthesized sinusoid are determined by minimizing the sliding mode variable $\sigma_k$ which defines the position of the system phase states relative to the sliding line. For references that are unknown and non-repeatable, an estimate of the derivative of the reference signal is computed, weighted, and added to weighted derivatives of the estimate, where the weights or coefficients of this function are also determined by minimizing the sliding mode variable $\sigma_k$.

BRIEF DESCRIPTION OF THE DRAWINGS

FIG. 8B shows details of the adaptive processor of FIG. 8A.

FIGS. 4A–14C show the response of the system to various step values when the system is operating near the chaotic boundary.

DETAILED DESCRIPTION OF THE DRAWINGS

SYSTEM OVERVIEW

In disk storage systems, such as magnetic and optical disk drives, a write transducer or write head writes digital data onto a disk storage medium in response to a write command received from a host system. The digital data serves to modulate a current in a write coil or an intensity of a laser beam so that a sequence of corresponding magnetic flux or optical transitions are written onto the disk medium in a series of concentric or spiral data tracks. To read this recorded data, a read transducer or read head passes over the disk medium and transduces the magnetic or optical transitions into pulses in an analog signal. These pulses are then decoded by read channel circuitry to reproduce the digital data.

The read head is typically actuated over the disk by means of a voice coil motor (VCM). In magnetic disk storage devices, the read head comprises a transducing coil suspended by a load beam and actuated radially over the disk by a rotary type VCM. In optical disk storage devices, the read head comprises optics and photodetectors housed in a sled assembly actuated by a two stage servoing mechanism: a first stage VCM actuator slides the sled assembly along a lead screw for coarse positioning the read head over a data track while seeking, and a second stage VCM actuator rotates an optical lens radially for fine positioning while tracking.

The servo system performs two functions: a "seek" or "access" function in which the servo system moves the head to a selected track; and when the head reaches the selected track, the servo system commences a "track following" or "tracking" function in which it accurately positions the head over a centerline of the track and maintains that position as successive portions of the track pass by the head. Servo control information embedded within the data provides inter-track head position information so that a head position error, indicative of a difference between the estimated head position and the desired head position, can be computed. In response to the head position error, the servo control system generates a VCM control signal to align the head over the centerline of the selected track, thereby driving the head position error to zero.

Figure 1:
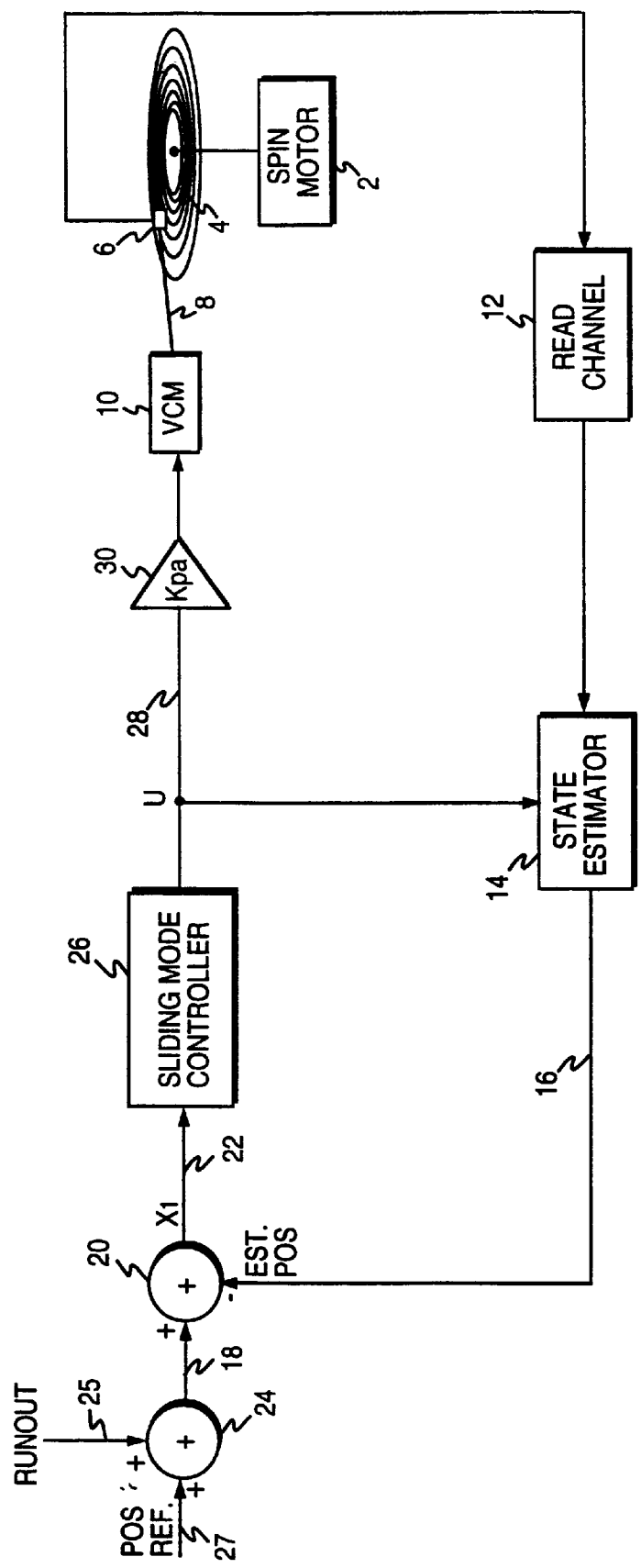
FIG. 1 is a block diagram of the disk drive control system of the present invention.

FIG. 1 is an overview of the disk drive control system of the present invention. A spin motor 2 spins a magnetic or optical disk 4 with computer data recorded thereon under a read head 6. An actuator 8 positions the read head 6 over a selected track, and a voice coil motor (VCM) 10 controls the motion of the actuator 8. Read channel circuitry 12, connected to receive the analog signal from the read head 6, demodulates the digital data recorded on the disk and transmits servo information to a state estimator 14. The state estimator 14 models the VCM control system in order to generate an estimated actuator position 16 that is subtracted from a reference actuator position 18 at adder 20 to produce an actuator position error X1 22. The reference actuator position 18 is the position of a selected track at which data is to be read (plus a runout signal 28 described below). A sliding mode controller 26, responsive to the actuator position error X1 22, computes an acceleration motor control signal U 28, amplified by amplifier 30, and applied to the VCM 10 to position the read head over the selected track. The state estimator 14 also processes the motor control signal U 28 to generate the estimated actuator position 16.

The state estimator 14 filters out errors in the servo position information caused by noise in the recording channel. State estimators are well known in the prior art such as described in U.S. Pat. No. 4,679,103, the disclosure of which is hereby expressly incorporated by reference. There are also other well known techniques other than state estimators for generating the actuator phase states for use by the present invention.

Figure 2A:
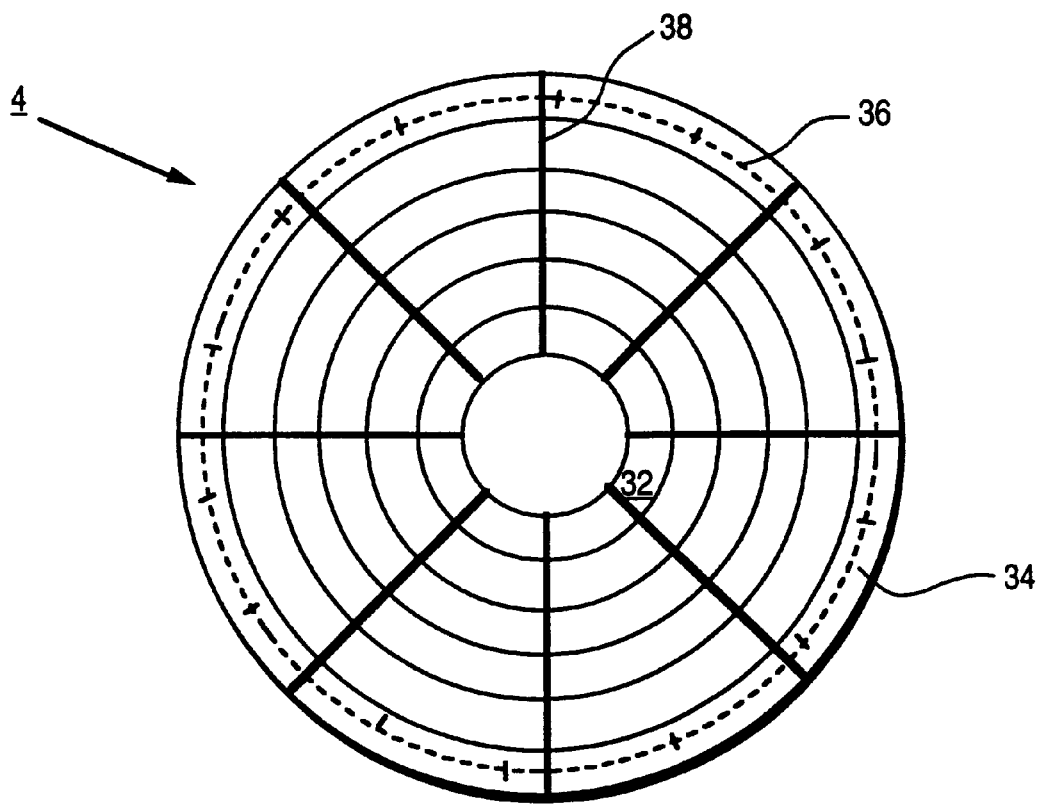
FIGS. 2A and 2B show an example data format of a magnetic disk comprising a plurality of concentric data tracks with embedded servo fields.
Figure 2B:
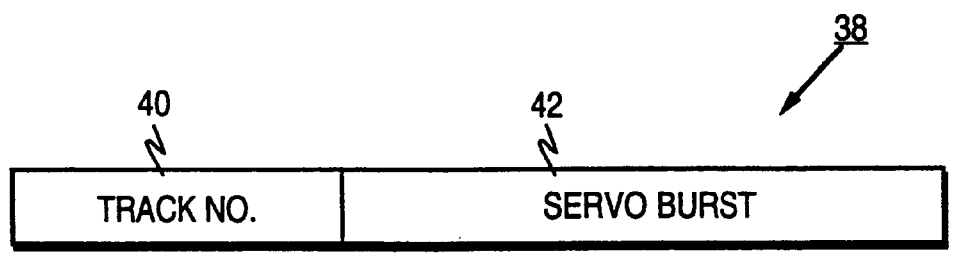

Referring now to FIGS. 2A and 2B, shown is an exemplary data format of a typical magnetic disk storage medium 4 comprising a plurality of concentric data tracks with an inner data track 32 and an outer data track 34. Each data track comprises a plurality of sectors 36 and a plurality of servo fields 38 embedded therein. The servo fields 38 comprise track number information 40 processed by the state estimator 14 to generate the estimated actuator position 16 while seeking the selected track. Once the read head slows to within a predetermined velocity as it approaches the selected track, the state estimator 14 processes the track number 40 and fine position information, such as servo bursts 42 in the servo fields 38, to align the head over the centerline of the selected track while reading the data. Servo bursts are commonly employed in magnetic disk storage devices and comprise a plurality of pulses recorded at precise intervals and offsets from the track centerline. The magnitude of these burst pulses sensed by the read head indicates the off track position of the head. In optical disk storage devices, the off track position information is derived by sensing the read signal's offset from the center of the photodetector.

In both magnetic and optical disk storage devices, the eccentricities of the disk storage medium may result in a sinusoidal reference signal referred to as runout. In FIG. 1, runout is modelled in the system by adding 24 a runout signal 25 to the position reference signal 27 representing the static centerline of the selected track. Thus, the runout is modelled as a component of the actual reference signal 18 used to generate the read head position error phase state X1 22. As described in greater detail below, it is necessary to derive an estimate of the derivative of the runout signal 25 (if not negligible) in order to enable operation of the sliding mode controller 26 of the present invention.

THEORY OF OPERATION

Figure 3A:
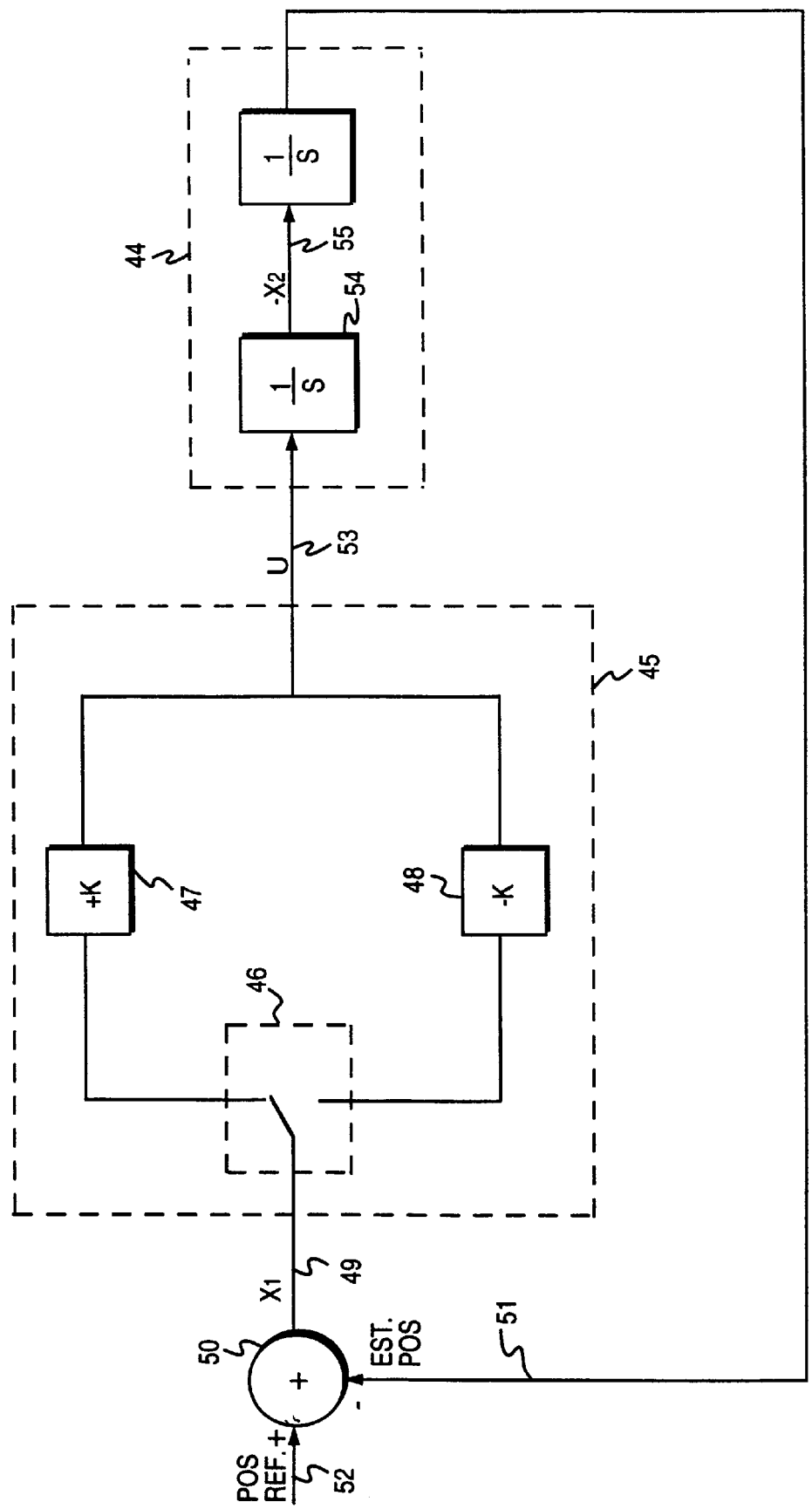
FIG. 3A shows an example second order system controlled by a sliding mode controller designed using the continuous time existence equation.

Operation of a conventional continuous-time sliding mode controller is understood with reference to FIG. 3A. Shown is an example second order system 44 controlled by an example sliding mode controller 45 that switches 46 between a positive gain 47 and negative gain 48 not necessarily equal in magnitude. A position error X1 49 is generated at the output of adder 50 by subtracting an estimated position 51 of the controlled system from a desired position reference command 52. The position error X1 49 is multiplied by the positive gain 47 or the negative gain 48 depending on the state of switch 46 to generate an acceleration command U 53 as the input to the controlled system 44. The output of integrator 54 is the velocity of the controlled system 44 which is also the negative of the position error velocity −X2 55. When switch 46 selects the positive gain 47, it is a negative feedback system, and when switch 46 selects the negative gain 48, it is a positive feedback system. In their individual structures the system is unstable; however, the system can be made stable by repeatedly switching between the two structures.

The state space equation in negative feedback is $$\frac{dX_1}{dt} = X_2 \quad (1)$$

$$\frac{dX_2}{dt} = -KX_1$$

The general solution to equation (1) is $$X_1 = A\sin(kt + \phi) \quad (2)$$

$$X_2 = \sqrt{K}\, A\cos(kt + \phi) \quad (3)$$

Combining equations (2) and (3), $$\frac{X_1^2}{A^2} + \frac{X_2^2}{KA^2} = 1 \quad (4)$$

Figure 3B:
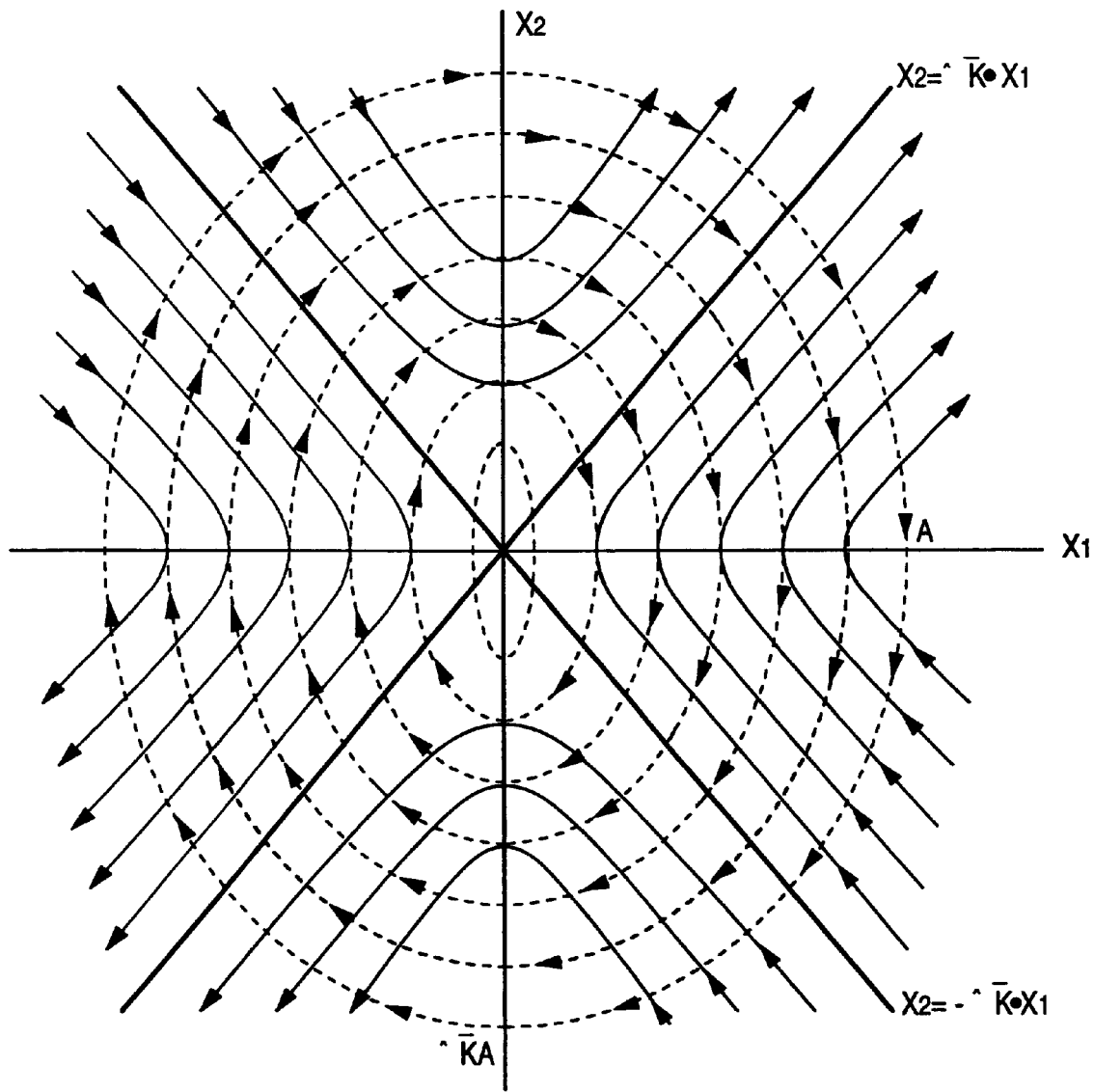
FIG. 3B are the phase plane plots for the position error and error velocity phase states for the positive and negative feedback modes e control system shown in FIG. 3A.

The phase plane plot of equation (4) is a set of ellipses with eccentricities A and √KA as illustrated in FIG. 3B.

The state space equation in positive feedback is $$\frac{dX_1}{dt} = X_2 \quad (5)$$

$$\frac{dX_2}{dt} = +KX_1$$

The solution to equation (5) is $$X_1 = B_1 e^{\sqrt{K}\,t} + B_2 e^{-\sqrt{K}\,t} \quad (6)$$

$$X_2 = \sqrt{K}\, B_1 e^{\sqrt{K}\,t} - K B_2 e^{-\sqrt{K}\,t}$$

Combining equations (5) and (6), $$\frac{X_1^2}{4B_1 B_2} - \frac{X_2^2}{4KB_1 B_2} = 1 \quad (7)$$

The phase plane plot of equation (7) is a set of hyperbolas with two asymptotes as shown in FIG. 3B.

The two individual phase plane trajectories of equations (4) and (7) result in an unstable system since the phase states never reach the origin. It is possible, however, to reach the origin by driving the phase states along a third phase trajectory defined at the intersection of the negative and positive feedback trajectories. This is achieved by switching between the positive and negative gains in response to the current phase state values so that the phase states follow the predetermined third phase trajectory.

Figure 4:
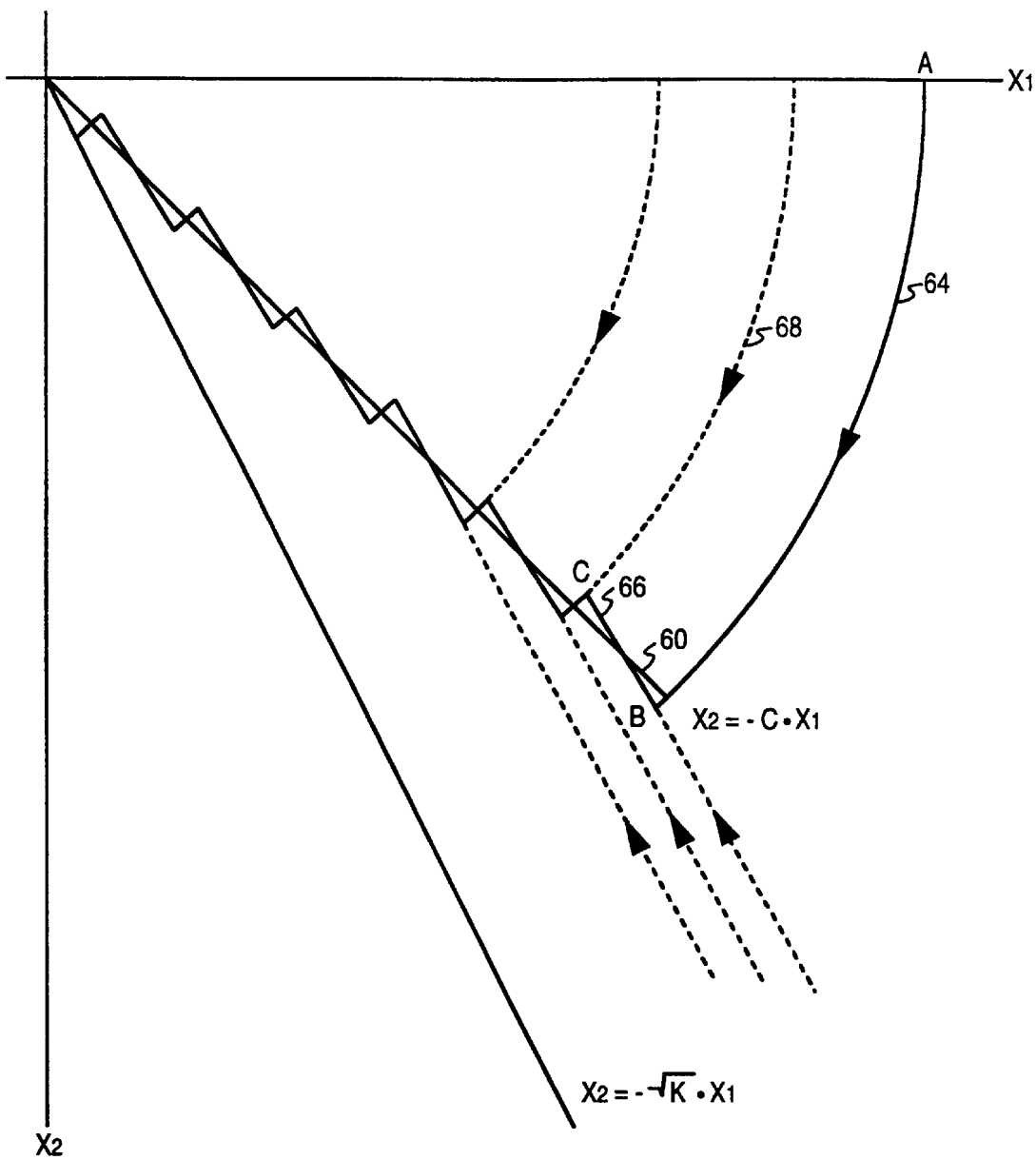
FIG. 4 illustrates the operation of the sliding mode controller in driving the phase states toward a predetermine linear phase trajectory.

The switching operation is understood with reference to FIG. 4 where the predetermined third phase trajectory is shown as a linear segment 60. When a new track is selected, the initial actuator position error is at point A, and the control system is initially switched to select the positive gain (i.e., negative feedback). As the actuator begins to accelerate toward the selected track, the phase states follow the arc trajectory 64 of the negative feedback mode. When the phase states reach the beginning of the third phase trajectory 60 at the intersection point B, the sliding mode controller switches to the negative gain and the phase states begin to follow the hyperbola trajectory 66 of the positive feedback mode. When the phase states cross the third phase trajectory

60 at point C, the controller switches back to the positive gain to drive the phase states along arc 68 back toward the third phase trajectory 60. This switching action is repeated so that the phase states slide along the linear segment 60 toward the origin of the phase plane. When the phase states are within a predetermined minimum distance from the origin of the phase plane, the system switches to a tracking mode where the sliding mode controller 26 repeatedly switches between positive and negative feedback in order to maintain the phase states near the origin of the phase plane, thereby aligning the read head 6 over the centerline of the selected track while reading the data.

The time domain response of the control system when the phase states follow the sliding line of FIG. 4 is $$X1(t)=X1(t1)e^{-C(t-t1)} \tag{8}$$

where t1 is the time when the phase states reach the sliding line at point B. Equation (8) is the average response of the system along the sliding line and it is substantially unaffected by variations in the parameter K or by external load disturbances. Consequently, it is not necessary to know the exact parameters of the system in order to determine the value for K. Equation (8), together with the existence Equation (11) below, demonstrate that the system's response is first order and globally stable within the sliding mode region.

The sliding mode controller determines when to switch between the positive and negative gains by observing the phase state values. The linear phase trajectory of FIG. 4 is defined by $$X2=-CX1 \tag{9}$$

where the constant C is the slope of the linear segment 60. By observing the phase states, the sliding mode controller switches the gains so that $$\sigma=X2+CX1=0. \tag{10}$$

The sliding mode controller switches to the positive gain when $\sigma X1>0$ and to the negative gain when $\sigma X1<0$ in order to drive the phase states toward the sliding line.

The overall response of the system is made faster by increasing the slope of the sliding line (i.e., increasing C). However, an important limitation in sliding mode control is that the sliding must be constrained to a region in the phase plane where the positive and negative feedback phase trajectories intersect in opposite directions. From FIG. 4 it follows that the slope of the sliding line must be constrained to $0<C<\sqrt{K}$. A further relationship derived from this constraint is $$\lim_{\sigma \to 0} \frac{\sigma d\sigma}{dt} < 0. \tag{11}$$

Equation (11) is known as the existence equation and is used to determine values for the positive and negative gains.

DISCRETE-TIME SLIDING MODE CONTROL

The present invention overcomes the drawbacks of sliding mode control which operates according the above-described continuous-time existence equation (11) by employing discrete-time sliding mode control. Consider a discrete-time system $$X_{k+1}=\Phi X_k+\Gamma U_k \tag{17}$$

where X is a state matrix representing the phase states of the system (position, velocity, acceleration, etc.), $\Phi$ is a linear control matrix, and $\Gamma$ is a scalar. A discrete-time control law is given by $$\sigma_{k+1}=\lambda\sigma_k-\Delta\text{sgn}(\sigma_k) \tag{18}$$

where $\sigma_k$ is a sliding mode variable computed from discrete-time phase state errors $\epsilon_k$, $\lambda$ and $\Delta$ are predetermined constants, and sgn(x) returns the sign of x. The discrete-time phase state errors $\epsilon_k$, such as the position error, velocity error, etc., are computed by subtracting the estimated phase states $X_k$ from a reference signal $R_k$ $$\epsilon_k=R_k-X_k \tag{19}$$

or by a suitable means for estimating the phase state errors. The sliding mode variable $\sigma_k$ of equation (18) is computed by multiplying the discrete-time phase state errors $\epsilon_k$ by a vector c which defines the sliding line in the phase plane $$\sigma_k=c\epsilon_k. \tag{20}$$

Substituting equation (20) into equation (18) yields $$c\epsilon_{k+1}=\lambda c\epsilon_k-\Delta\text{sgn}(\sigma_k). \tag{21}$$

Substituting equations (17) and (19) into equation (21) yields $$c(R_{k+1}-(\Phi X_k+\Gamma U_k))=\lambda c(R_k-X_k)-\Delta\text{sgn}(\sigma_k).$$

Solving for $U_k$ yields the control law for the servo problem $$U_k=c(\Phi-\lambda I)(c\Gamma)^{-1}\epsilon_k+c(R_{k+1}-\Phi R_k)(c\Gamma)^{-1}+\Delta(c\Gamma)^{-1}\text{sgn}(\sigma_k). \tag{22}$$

Defining $$\Psi=c(\Phi-\lambda I)(c\Gamma)^{-1}; \text{ and}$$

$$\Lambda_{k+1}=c(R_{k+1}-\Phi R_k)(c\Gamma)^{-1};$$

yields $$U_k=\Psi\epsilon_k+\Lambda_{k+1}+\Delta(c\Gamma)^{-1}\text{sgn}(\sigma_k). \tag{23}$$

The control law (23) for the servo problem is a linear combination of the error states, a feed-forward term that requires knowledge of the reference, and a switching term based on the sliding line. Note that for the general regulator problem, the reference term $\Lambda_{k+1}$ is normally set to zero for all states which is an accurate model for many systems such as magnetic disk storage systems.

ESTIMATION OF $\Lambda_{k+1}$

The term $\Lambda_{k+1}$ in the control law (23) approximates the derivative of the reference signal $R_k$ and is thus called the pseudo derivative of the reference $R_k$. For a large class of problems, $\Lambda_{k+1}$ does not present a significant problem because the phase state trajectories of the system are well defined in an a priori sense, and the system trajectories are controlled in real time by manipulating $\Lambda_{k+1}$. Robotic manipulators are a good example of such systems. However, for a wide class of servo systems direct access to the reference is not available, and only information at the error node(s) may be used to estimate the apparent reference. Magnetic and optical disk storage devices are examples of such systems.

Equation (22) can be rewritten as $$\Lambda_{k+1} = U_k - c\Phi(c\Gamma)^{-1}\epsilon_k + \lambda(c\Gamma)^{-1}\sigma_k - \Delta(c\Gamma)^{-1}\mathrm{sgn}(\sigma_k). \quad (24)$$

Using the discrete-time existence equation (18), equation (24) can be written as $$\Lambda_{k+1} = U_k - c\Phi(c\Gamma)^{-1}\epsilon_k + (c\Gamma)^{-1}\sigma_{k+1}.$$

For most systems where the reference is changing slowly compared to the sample rate, $\Lambda_{k+1}$ may be estimated as $$\Lambda_{k+1} \approx \Lambda_k = U_{k-1} - c\Phi(c\Gamma)^{-1}\epsilon_{k-1} + (c\Gamma)^{-1}\sigma_k. \quad (25)$$

The accuracy of equation (25) can be improved using a Taylor series expansion $$\Lambda_{k+1} \approx \Lambda_k + (\Lambda_k - \Lambda_{k-1})/T. \quad (26)$$

Equation (25) is a function of the prior control effort, the prior error, and the current value of $\sigma$. Other methods could be employed to estimate $\Lambda_{k+1}$, including Kalman Estimators.

HARDWARE DESCRIPTION

Figure 5A:
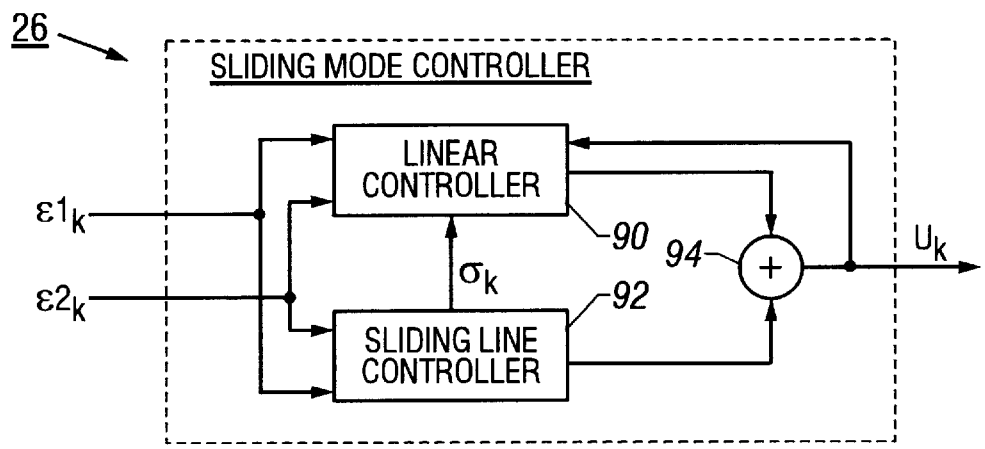
FIG. 5A is a block diagram of the discrete-time sliding mode controller of the present invention comprising a linear control signal generator and a sliding line signal generator.

FIG. 5A is a block diagram of the sliding mode controller 26 of the present invention for use in a second order system (the aspects of the present invention can easily be extended to higher order systems). In this embodiment, the sliding mode controller 22 is responsive to two phase state errors, $\epsilon 1(k)$ and $\epsilon 2(k)$, which may represent a position error and a velocity error of the actuator 8. Various methods are known in the art for generating phase state errors, including the state estimator 14 shown in FIG. 1. The phase state errors are input into a linear controller 90 and a sliding line controller 92, and their outputs are combined at adder 94 to implement the control effort $U_k$ of equation (23). The sliding line controller 92 generates the sliding line variable $\sigma_k$ which is input into the linear controller 90 for use in computing the pseudo derivative reference term $\Lambda_{k+1}$.

Figure 5B:
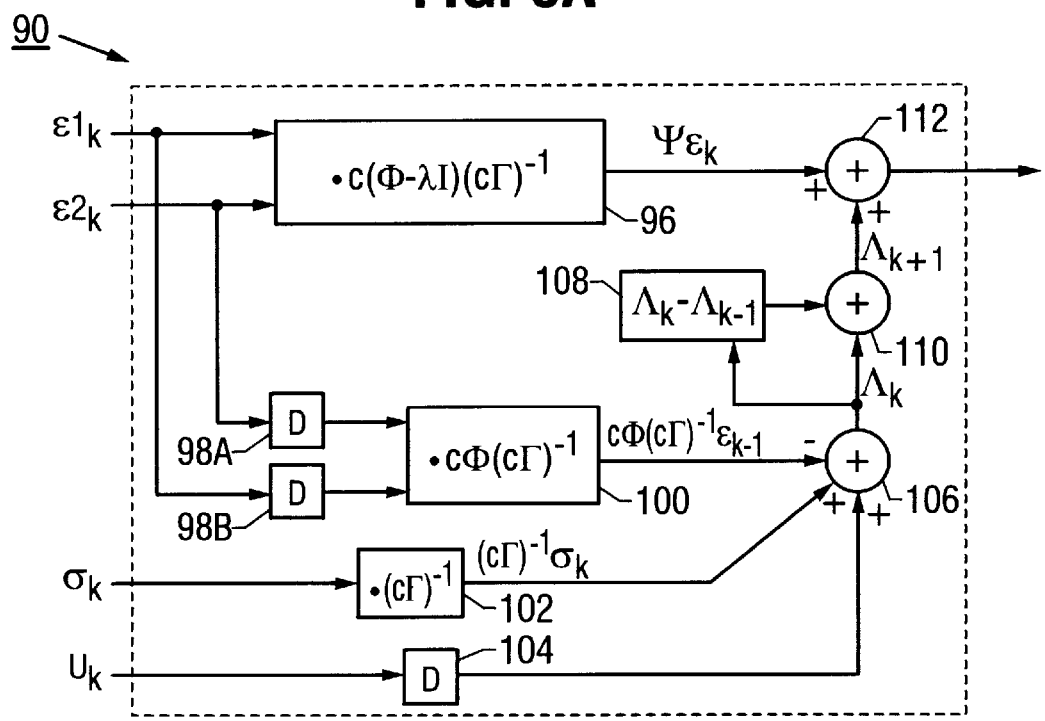
FIG. 5B shows details of the linear control signal generator of FIG. 5A, including a means for estimating the pseudo derivative of the reference signal.

Details of the linear controller 90 of FIG. 5A are shown in FIG. 5B. The error phase states are multiplied 96 by $$c(\Phi - \lambda I)(c\Gamma)^{-1}$$

to generate the term $$\Psi \epsilon_k$$

of equation (23). To generate an estimate of the pseudo derivative reference term $\Lambda_{k+1}$, the phase state errors are delayed through delay elements 98A and 98B and then multiplied 100 by $$c\Phi(c\Gamma)^{-1}$$

to generate the term $$c\Phi(c\Gamma)^{-1}\epsilon_{k-1}$$

of equation (25). The sliding line variable $\sigma_k$ is multiplied 102 by $$(c\Gamma)^{-1}$$

to generate the term $$(c\Gamma)^{-1}\sigma_k$$

of equation (25). The control effort $U_k$ is delayed by delay element 104 and the estimated pseudo derivative reference (PDR) term $\Lambda_k$ generated at the output of adder 106 thereby implementing equation (25). The first difference 108 of $\Lambda_k$ is computed and added 110 to $\Lambda_k$ to generate the estimated PDR term $\Lambda_{k+1}$ according to equation (26). The estimated PDR term $\Lambda_{k+1}$ is then added 112 to the output of multiplier 96 to generate the term $$\Psi \epsilon_k + \Lambda_{k+1}$$

of equation (23).

Figure 5C:
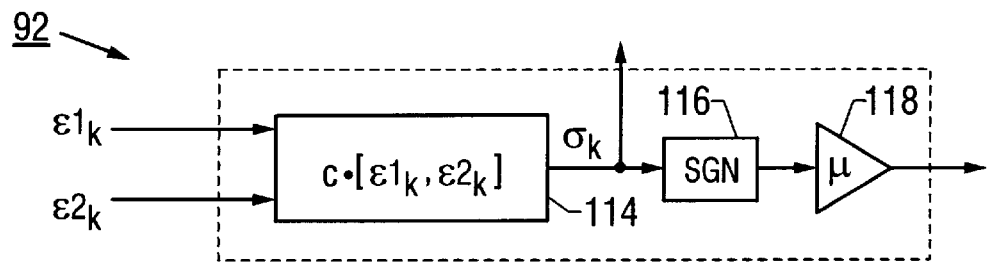
FIG. 5C shows details of the sliding line signal generator of FIG. 5A.

. Details of the sliding line controller 92 of FIG. 5A are shown in FIG. 5C. The phase state errors are multiplied 114 by the sliding line c where c defines the phase state trajectory in the phase plane as described above. For example, in equation (16) the sliding line c is defined as $$c = [1, C3].$$

The multiplication of the phase state errors by the sliding line c generates the sliding line variable $\sigma_k$ per equation (20). The sign 116 of the sliding line variable $\sigma_k$ is multiplied 118 by $$\mu = \Delta(c\Gamma)^{-1}$$

to generate the term $$\mu \mathrm{sgn}(\sigma_k)$$

of equation (23).

$\sigma_k$ STEADY STATE

In the control law of equation (18), $\sigma_k$ is non-increasing and changes sign on successive sample periods. When $\sigma_k < 0$, to maintain stability and simultaneous switching it requires $$\sigma_{k+1} \leq -\sigma_k.$$

From the above equations $$c\epsilon_{k+1} \leq -c\epsilon_k;$$
$$c(R_{k+1} - (\Phi X_k + \Gamma U_k)) \leq -c\epsilon_k.$$

Solving for $U_k$ yields $$U_k \geq c(\Phi + I)(c\Gamma)^{-1}\epsilon_k + c(R_{k+1} - \Phi R_k)(c\Gamma)^{-1}. \quad (27)$$

However, an expression for $U_k$ has already been derived in equation (22). Substituting equation (22) into (27) yields $$c(\Phi\lambda I)(c\Gamma)^{-1}\epsilon_k + c(R_{k+1} - \Phi R_k)(c\Gamma)^{-1} + \Delta(c\Gamma)^{-1}\mathrm{sgn}(\sigma_k) \geq c(\Phi + I)(c\Gamma)^{-1}\epsilon_k + c(R_{k+1} - \Phi R_k)(c\Gamma)^{-1}$$

Combining terms and simplifying leads to $$(-\lambda c\epsilon_k + \Delta \mathrm{sgn}(\sigma_k)) \geq c\epsilon_k$$

which leads to $$\Delta/(1+\lambda)\mathrm{sgn}(\sigma_k) \geq \sigma_k$$

A similar result follows for $\sigma_k > 0$ with the inequality reversed, which leads to $$\alpha/(1\lambda) \leq \sigma_k \leq \Delta/(1\lambda) \quad (28)$$

Equation (28) specifies that the absolute magnitude of the sliding mode variable $\sigma_k$ will be constrained within a boundary layer such that $$|\sigma_k| \leq \Delta/(1+\lambda)$$

The width of the boundary layer is a function of the $\Delta$, $\lambda$ and the sampling rate. The width of the boundary layer is generally defined through selecting an appropriate value for $\Delta$, whereas the time constant of the loop is generally defined through appropriate selection of $\lambda$ and the slope of the sliding line c. The system's insensitivity to parameter variations and load disturbances is increased by increasing the width of the boundary layer (i.e., increasing $\Delta$), the trade-off being an increase in the required control effort and an increase in switching noise.

As described in greater detail below, the servo system can be adapted in real time so as to maintain the optimal condition where the magnitude of the sliding mode variable $\sigma_k$ in steady state remains constant (i.e., $\sigma_{k+1} = -\sigma_k$) while satisfying the discrete-time switching condition of crossing the sliding line at every sample period. This maintains a constant, and arbitrarily small boundary layer that in turn minimizes the switching noise.

DESIGN OF THE SLIDING LINE

The steady state behavior of $\sigma_k$ as described above can be used to determine the optimal value for the sliding line c. Multiplying both sides of equation (28) by $\epsilon_k^T$ yields $$\sigma_k \epsilon_k^T = c \epsilon_k \epsilon_k^T = \Delta/(1+\lambda) \text{sgn}(\sigma_k) \epsilon_k^T.$$

Taking the expectation E of both sides with $E(\epsilon_k^T)=0$, yields the matrix equation $$cE(\epsilon_k \epsilon_k^T)=0. \tag{29}$$

Expanding equation (29) and assuming a second order system without loss of generality, yields the simultaneous equations $$c_1 E(\epsilon_k^1 \epsilon_k^1) + E(\epsilon_k^1 \epsilon_k^2) = 0$$

$$c_1 E(\epsilon_k^2 \epsilon_k^1) + E(\epsilon_k^2 \epsilon_k^2) = 0$$

For a stationary or deterministic process $$E(\epsilon_k^1 \epsilon_k^2) = E(\epsilon_k^2 \epsilon_k^1).$$

Solving the simultaneous equations results in an expression for c $$c_1^2 = E(\epsilon_k^2 \epsilon_k^2)/E(\epsilon_k^1 \epsilon_k^1). \tag{30}$$

Equation (30) illustrates that the slope of the sliding line c is a function of the ratio between the rms error of the two states (i.e., the ratio of the rms position error over the rms velocity error) for a second order system. The expected rms position error is generally one of the design criteria of a system, and is therefore known (it is usually specified as a ratio between the reference and the error at specific reference frequencies). The rms velocity error will follow as a result of the system model.

ADAPTING TO PLANT GAIN VARIATIONS

The present invention uses the discrete-time existence equation (18) together with the sliding mode condition that $\sigma_k$ cross the sliding line at every sample instance in order to adapt the controller to compensate for gain variations in the plant due, for example, to temperature or parameter drift. Adapting to gain variations in the plant increases the system's insensitivity to parameter variations without having to increase the boundary layer and attendant switching noise. Furthermore, because the boundary layer is minimized, the slope of the sliding line can be increased to a more optimal value while maintaining global stability.

Expressing the plant gain variation as $\beta$ (with $\beta=1$ nominal), the discrete-time system (17) can be rewritten as $$X_{k+1} = \Phi X_k + \beta \Gamma U_k.$$

From equations (22) and (23), algebraic manipulations leads to the discrete-time error equation $$\epsilon_{k+1} = \epsilon_k(\Phi - \beta \Gamma \Psi) + (I - \beta \Gamma c(c\Gamma)^{-1})(R_{k+1} - \Phi R_k) - \beta \Gamma \Delta (c\Gamma)^{-1} \text{sgn}(\sigma_k) \tag{31}$$

Multiplying by c and simplifying results in an expression for $\sigma$ $$\sigma_{k+1} = c(1-\beta)(R_{k+1} - \Phi R_k) + (1-\beta) c \Phi \epsilon_k + \beta(\lambda \sigma_k - \Delta \text{sgn}(\sigma_k)). \tag{32}$$

Figure 6:
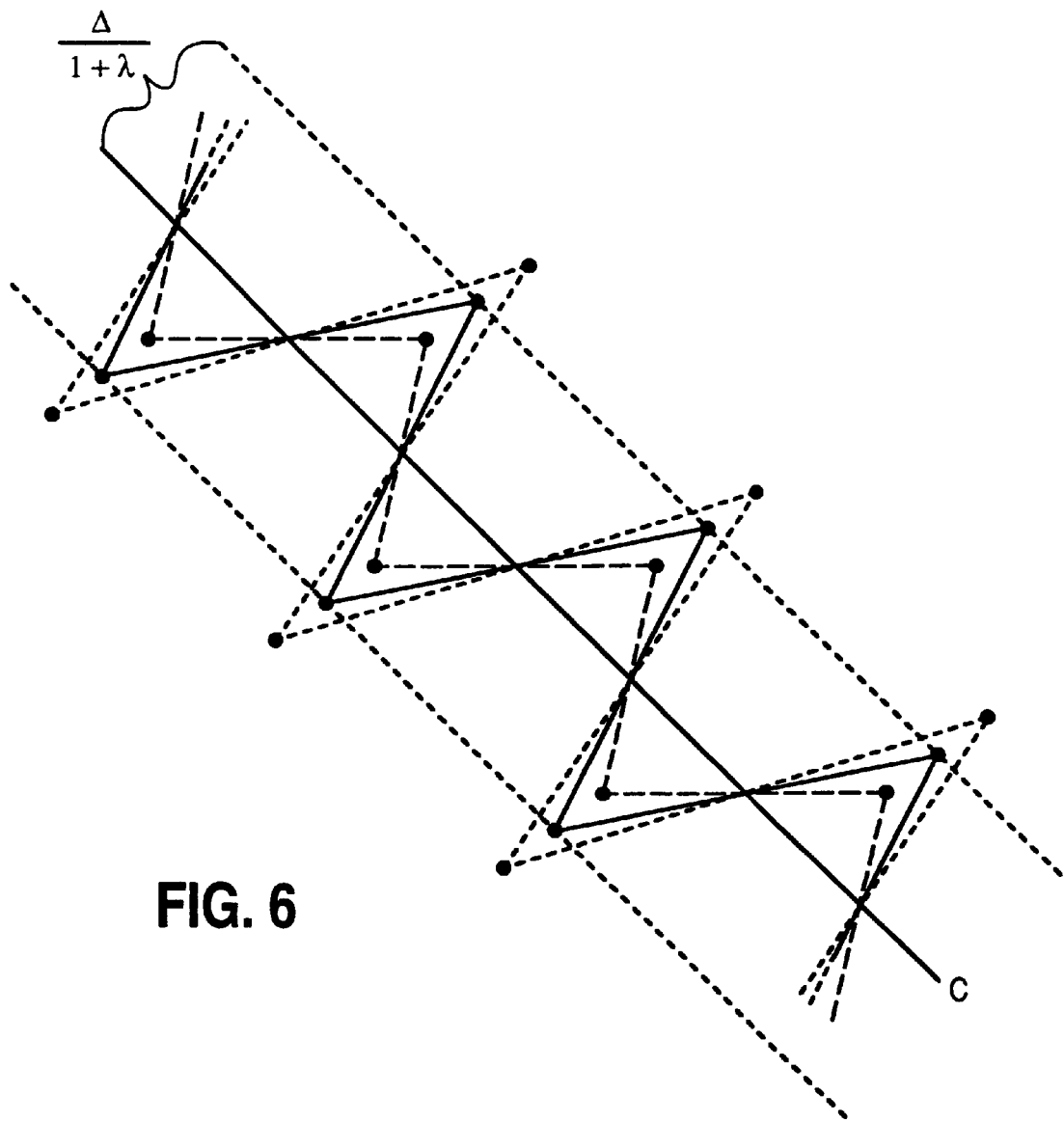
FIG. 6 illustrates the zigzag switching action of the sliding mode variable $\sigma_k$ and the effect on the magnitude of $\sigma_k$ when the plant gain charges.

The third term in equation (32) is equivalent to the nominal value of $\sigma_{k+1}$ multiplied by the gain variation $\beta$ and thus represents a direct measurement of the plant gain departure from nominal. The first and second terms of equation (32) represent movement away from the nominal gain of unity. This is understood with reference to FIG. 6 which shows the sliding line c and the nominal amplitude $\Delta/(1+\lambda)$ of the sliding mode variable $\sigma_k$ according to equation (28). Thus, when the gain is nominal ($\beta=1$) the sliding mode variable $\sigma_k$ will switch between positive and negative values at every sample period and remain on the dashed lines representing the sliding line boundary layer. If the plant gain decreases then the magnitude of the sliding mode variable $\sigma_k$ will decrease, and if the plant gain increases the magnitude of the sliding mode variable $\sigma_k$ will increase as shown in FIG. 6. Thus, one adaptive strategy is to adapt the loop gain in order to adjust the measured value of $\sigma_k$ toward the nominal steady state value $\Delta/(1+\lambda)$ (i.e. toward the dashed lines in FIG. 6).

Figure 7:
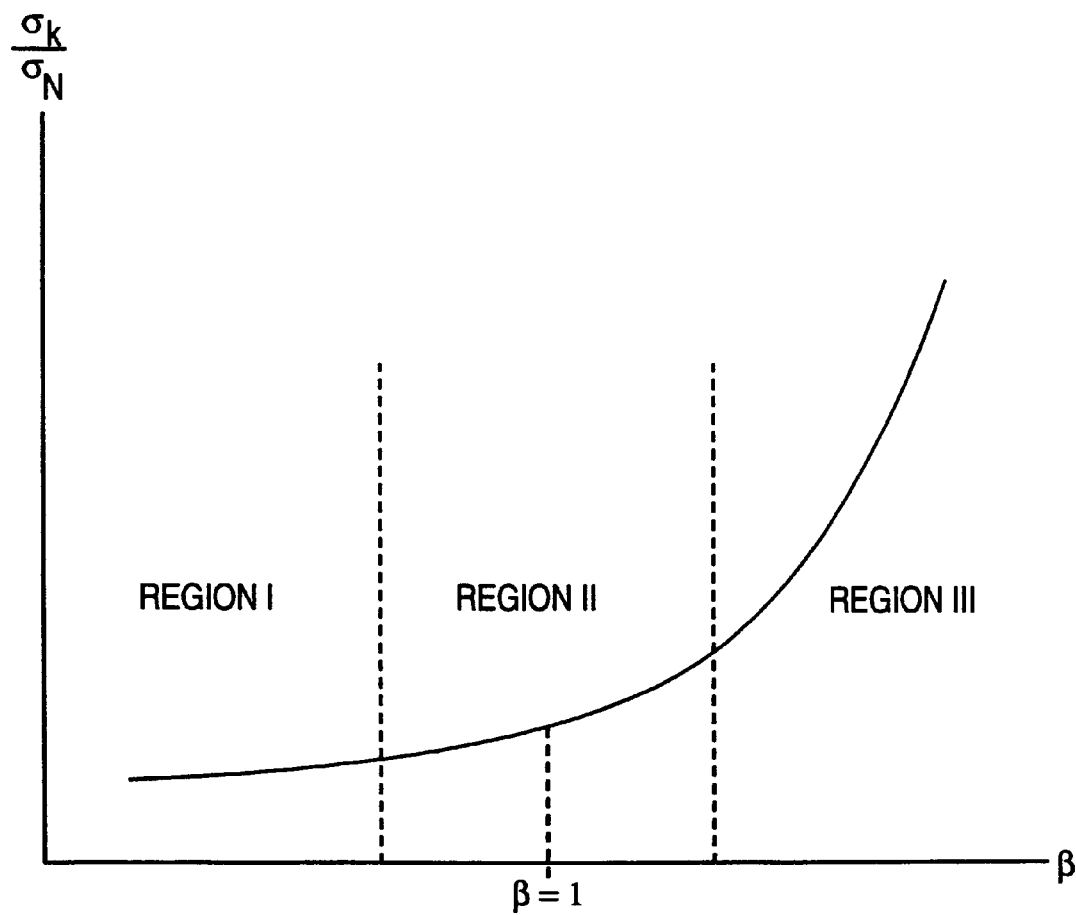
FIG. 7 illustrates various regions of operation which defines when the sliding mode variable $\sigma_k$ will cross the sliding line on every sample period, and when the system will become unstable.

As discussed in greater detail below, if the gain of the plant drops below a certain threshold, then the sliding mode variable $\sigma_k$ will not cross the sliding line and change sign on every sample period. Conversely, if the gain exceeds a certain threshold, then the system will become unstable. Thus, there are three regions of operation as illustrated in FIG. 7 which is a plot of the gain variance $\beta$ versus the magnitude of the sliding mode variable $\sigma_k$. In region I, the gain of the plant is below the lower threshold and $\sigma_k$ does not switch across the sliding line at every sample period. In region III, the gain of the plant exceeds the upper threshold and the system is unstable. In the region between I and III (region II), the system is stable and the sliding mode variable $\sigma_k$ crosses the sliding line and changes sign on every sample period. Thus, the system will operate normally and adapt to changes in the plant gain as long as the gain changes slow enough such that magnitude of $\sigma_k$ remains within region II.

Figure 8A:
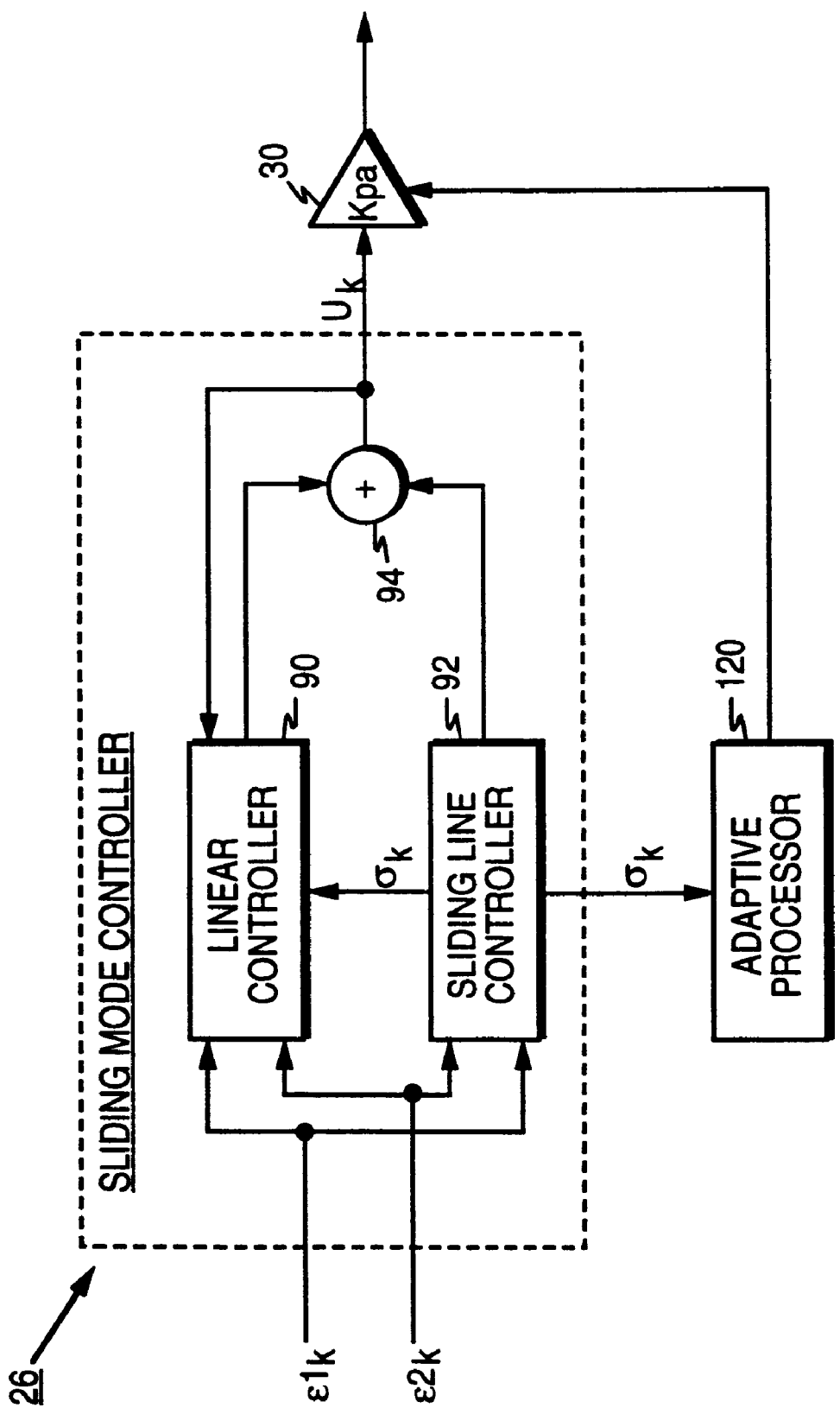
FIG. 8A is a block diagram of the discrete-time sliding mode controller comprising an adaptive processor for adaptively adjusting the gain of the plant by minimizing the deviation in the magnitude of $\sigma_k$ from nominal.
Figure 9:
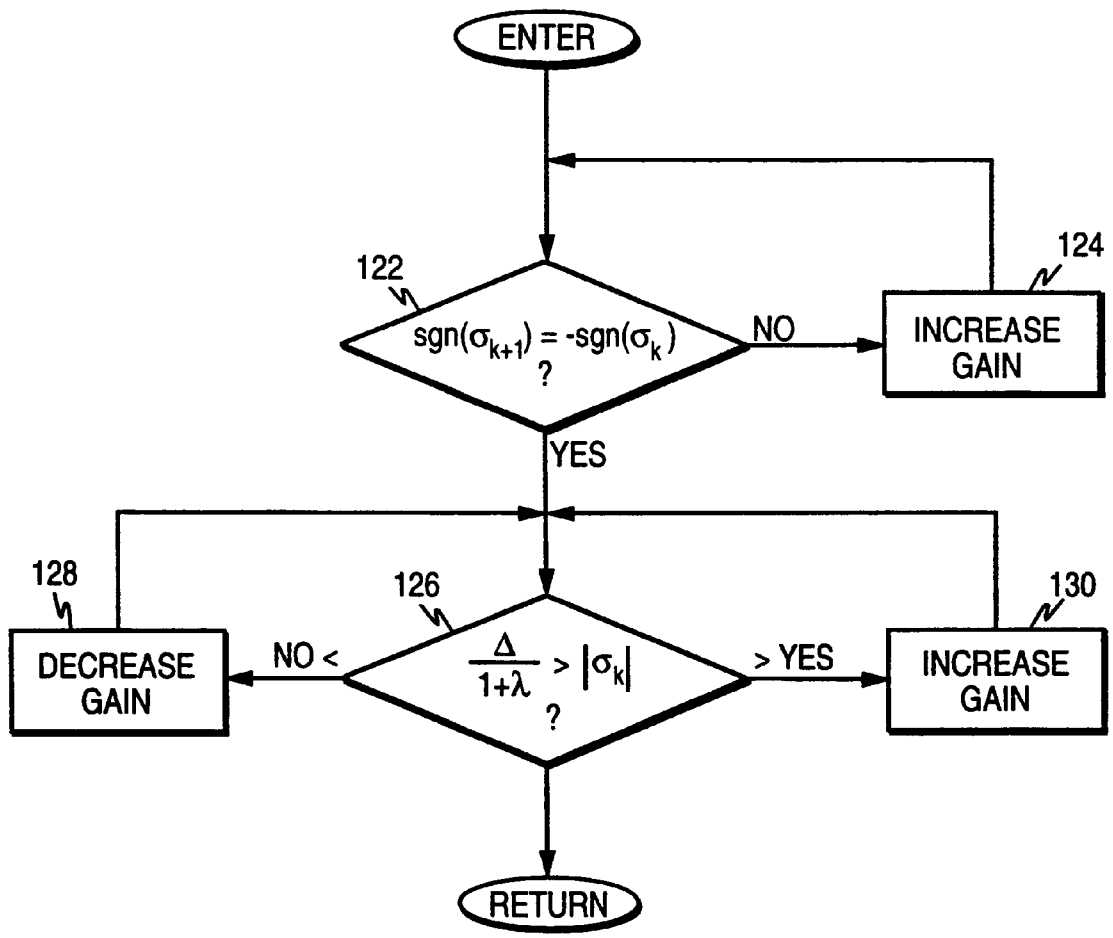
FIG. 9 is a flow diagram executed by the adaptive processor of FIG. 8A.

FIG. 8A is a block diagram of the adaptive, discrete-time sliding mode controller of the present invention. The sliding line variable $\sigma_k$ output by the sliding line controller 92 is processed by an adaptive processor 120 which in turn adjusts the plant gain Kpa 30 according to the flow diagram of FIG. 9. First at step 122 a check is made to determine if the sliding line variable $\sigma_k$ is crossing the sliding line and changing signs at every sample period. If not, then a loop is executed where the plant gain is incremented at step 124 until $\sigma_k$ begins to switch at every sample interval. Then at step 126 a branch is executed based on the absolute magnitude of $\sigma_k$. If the magnitude of $\sigma_k$ is greater than nominal (i.e., greater than $\Delta/1+\lambda$), then at step 128 the plant gain is decreased incrementally. If at step 126 the magnitude of $\sigma_k$ is less than nominal, then the plant gain is increased incrementally at step 130. Steps 128 and 130 are repeated until the magnitude of $\sigma_k$ reaches the nominal value of $\Delta/1+\lambda$.

Details of the adaptive processor 120 of FIG. 8A are shown in FIG. 8B. The adaptive processor 120 comprises: a switching detector 121 for determining whether $\sigma_k$ is switching across the sliding line at every sample interval, an amplitude detector 123 for measuring the absolute magnitude of $\sigma_k$, an error detector 125 for detecting an error between the measured amplitude of $\sigma_k$ and the nominal amplitude, and a stability detector 127 for detecting when the system has the potential for going unstable (i.e., when $\sigma_k$ crosses into region III in FIG. 7).

Many filtering options exist for implementing the switching detector 121; in FIG. 8B, a simple one-delay correlator is employed which operates according to the following equation $$D_k = \frac{1}{m} \sum_{j=0}^{m} \text{sgn}(\sigma_{k-j}) \text{sgn}(\sigma_{k-j-1})$$

where m is a predetermined integer. In the above equation, if all m prior values of $\sigma_k$ have changed sign, then $D_k$ would equal $-1$. If not, then $D_k > -1$. A threshold 129 may be employed in the switching detector 121 to compensate for noise; for example, $-1<D_k>t$ where t is the threshold based upon anticipated noise. More filtering may be added if necessary by prior filtering $\sigma_k$ prior to the correlator.

When $94_k$ is in region II or III of FIG. 7, it is necessary to determine the magnitude for $\sigma_k$ which is then compared to the nominal value to generate the error signal, as well as to determine stability of the system. In these regions, the magnitude of $\sigma_k$ is either constant or increasing, therefore the first difference of $\sigma_k$ is a convenient detector (other techniques, such as the rms value of sigma are also possible). If the first difference is constant, then operation in region II is assured. If the first difference is increasing, then $\sigma_k$ is in region III. The amplitude detector 123 of FIG. 8B operates according to $$Sam_k = |\sigma_k - \sigma_{k-1}|_F$$

where the subscript F denotes a filtering operation 131 on the absolute value 133 of the first difference 135. The filter is chosen based on the expected noise; a simple moving average filter with binary coefficients will generally suffice.

The error detector 125 of FIG. 8B generates the error between the measured amplitude of $\sigma_k$ and the nominal amplitude; the error is then used in the adaptation algorithm as described above. The nominal value for the amplitude of $\sigma_k$ is $$\Delta/(1+\lambda)$$

the error is detected as $$err_k = 2\Delta/(1+\lambda) - |\sigma_k - \sigma_{k-1}|_F.$$

The stability detector 127 of FIG. 8B determines when $\sigma_k$ has crossed over into region III of FIG. 7 where the system may become unstable. Detecting when $\sigma_k$ crosses into region III allows higher gains to be used in the adaptation algorithm. Furthermore, the adaptive, discrete-time sliding mode controller of the present invention can stabilize an unstable system when $\sigma_k$ crosses into region III. The stability detector 127 is implemented by passing the measured amplitude of $\sigma_k$ through a simple 1-D low-pass filter, and comparing the output to a threshold 137. When the average amplitude of $\sigma_k$ exceeds the threshold 137, it has crossed into region III of FIG. 7.

The output of the switching detector 121 and stability detector 127 are used to determine which of the three regions in FIG. 7 $\sigma_k$ is currently in. Based on this decision, the gain of the adaptation loop is adjusted by selecting one of three predetermined gains through a multiplexer 139 as shown. The decision logic 141 and gain selected is illustrated in the following table

TABLE 1

| Stability Detector | $\sigma_k$ Sign Correlator | Selected Gain |
|---|---|---|
| Unstable | — | G1 |
| Stable | Switching Every Sample | G2 |
| Stable | Not Switching Every Sample | G3 |

The selected gain is then multiplied 143 by the error in $\sigma_k$ and the result added 145 to the previous gain adjustment value $\beta_{k-1}$ to generate the current gain adjustment value $\sigma_k$. The gain adjustment value $\beta_k$ is then used to adjust the gain of the system amplifier 30 shown in FIG. 1.

The above-described adaptation strategy will work for small deviations of $\sigma_k$ from nominal, but may not be adequate for cases where the deviation is significant since the first and second terms may dominate the third term in equation (32). To determine the regions where the adaptation strategy will work, it is first necessary to determine the steady state value of the errors $\epsilon_k$ and by inference $\sigma_k$.

$\epsilon_k$ STEADY STATE

The steady state errors $\epsilon_k$ can be determined using equation (31). Defining $$\Phi_0 = \Phi - \beta\Gamma\Psi$$

$$A = I - \beta\Gamma c(c\Gamma)^{-1}$$

$$B = \beta\Gamma\Delta(c\Gamma)^{-1}$$

equation (31) can be written as $$\varepsilon_{k+1} = \Phi_0\varepsilon_k + A(R_{k+1} - \Phi R_k) - Bsgn(\sigma_k) \quad (33)$$

$$\varepsilon_{k+2} = \Phi_0\varepsilon_{k+1} + A(R_{k+2} - \Phi R_{k+1}) - Bsgn(\sigma_{k+1})$$

$$= \Phi_0^2\varepsilon_k + \Phi_0 A(R_{k+1} - \Phi R_k) - \Phi_0 Bsgn(\sigma_k) +$$

$$A(R_{k+2} - \Phi R_{k+1}) - Bsgn(\sigma_{k+1}).$$

$$\varepsilon_{k+3} = \Phi_0\varepsilon_{k+2} + \Phi_0^2 A(R_{k+3} - \Phi R_{k+2}) - Bsgn(\sigma_{k+2})$$

$$= \Phi_0^3\varepsilon_k + \Phi_0^2 A(R_{k+1} - \Phi R_k) - \Phi_0^2 Bsgn(\sigma_k) +$$

$$\Phi_0 A(R_{k+2} - \Phi R_{k+1}) - \Phi_0 Bsgn(\sigma_{k+1}) +$$

$$A(R_{k+3} - \Phi R_{k+2}) - Bsgn(\sigma_{k+2}).$$

$$\varepsilon_{k+n} = \Phi_0^n \varepsilon_k + \sum_{j=0}^{n-1} \Phi_0^j (A((R_{k+n-j} - \Phi R_{k+n-j-1}) -$$

$$Bsgn(\sigma_{k+n-j-1})))$$

Equation (33) may be simplified if we first consider the regulator problem where R=0. The steady state regulator error may be determined by taking the limit of the resulting equation $$\lim_{n\to\infty} \varepsilon_{k+n} = \lim_{n\to\infty}\left\{\Phi_0^n \varepsilon_k - \sum_{j=0}^{n-1}(\Phi_0^j B)sgn(\sigma_{k+n-j-1})\right\} \quad (34)$$

With the assumption that the sign of $\sigma$ changes on successive sample intervals, equation (34) represents a geometric series which can be further reduced $$\lim_{n\to\infty}\left\{\Phi_0^n \varepsilon_k - \sum_{j=0}^{n-1}(\Phi_0^j B)sgn(\sigma_{k+n-j-1})\right\} = \quad (35)$$

$$\lim_{n\to\infty}\left\{\Phi_0^n \varepsilon_k - \sum_{j=0}^{n-1}(I-(-1)^{n-j}\Phi_0^{j+1})(I-(-1)^1\Phi_0)^{-1}B\right\}$$

With all elements of $\Phi_0$ less than one, equation (35) reduces to $$\lim_{n\to\infty} \varepsilon_{k+n} = \lim_{n\to\infty}\{\Phi_0^n \varepsilon_k\} + (I+\Phi_0)^{-1}B = 0 + ((I+\Phi_0)^{-1}\beta)\Gamma\Delta(c\Gamma)^{-1} \quad (36)$$

The steady state value of $\sigma$ may also be determined from equation (36). Multiplying by c and $sgn(\sigma_k)$, $\sigma_{k+1}$ is $$\sigma_{k+1} = c(I+\Phi_0)^{-1}\beta\Gamma\Delta(c\Gamma)^{-1}sgn(\sigma_k). \quad (37)$$

Figure 10:
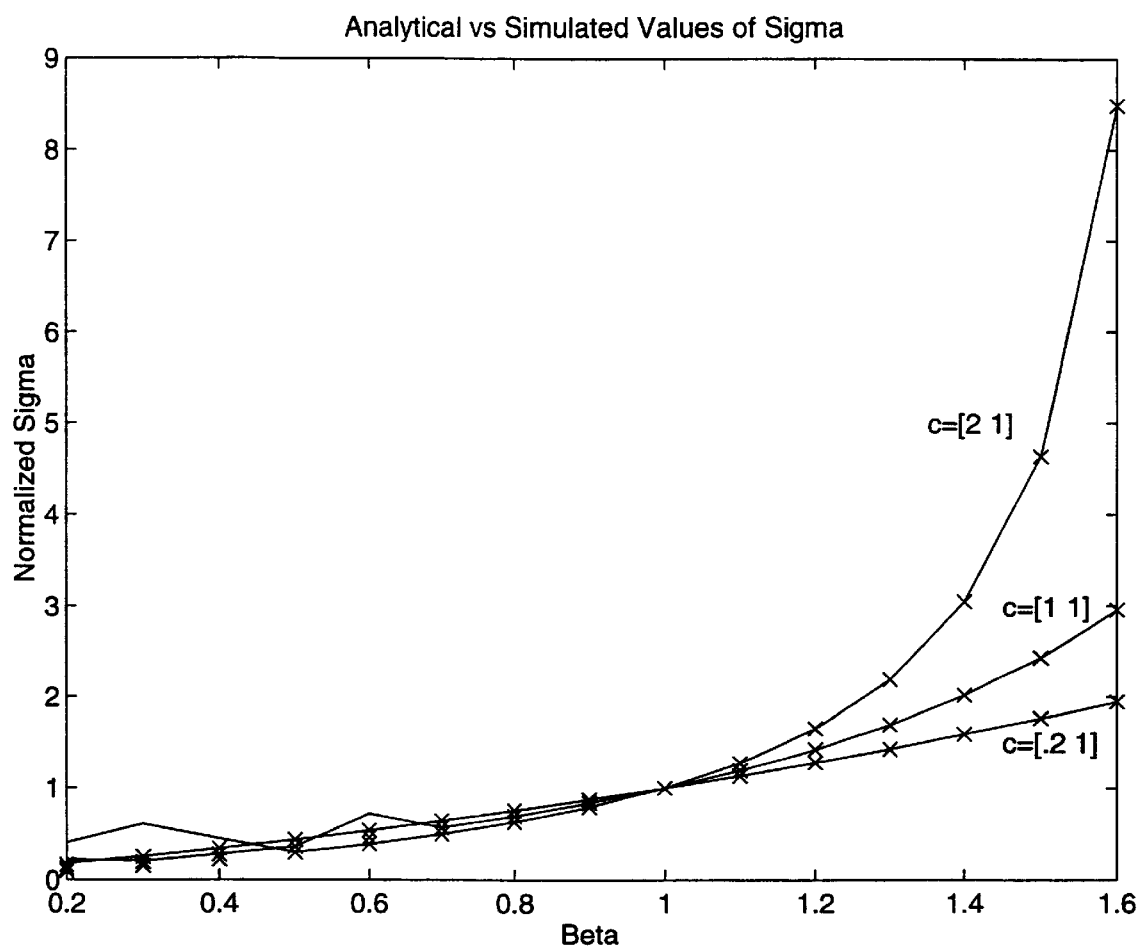
FIG. 10 is a plot of the analytical versus simulated values of the magnitude of the sliding mode variable $\sigma_k$ over a range of plant gain variations.
Figure 11A:
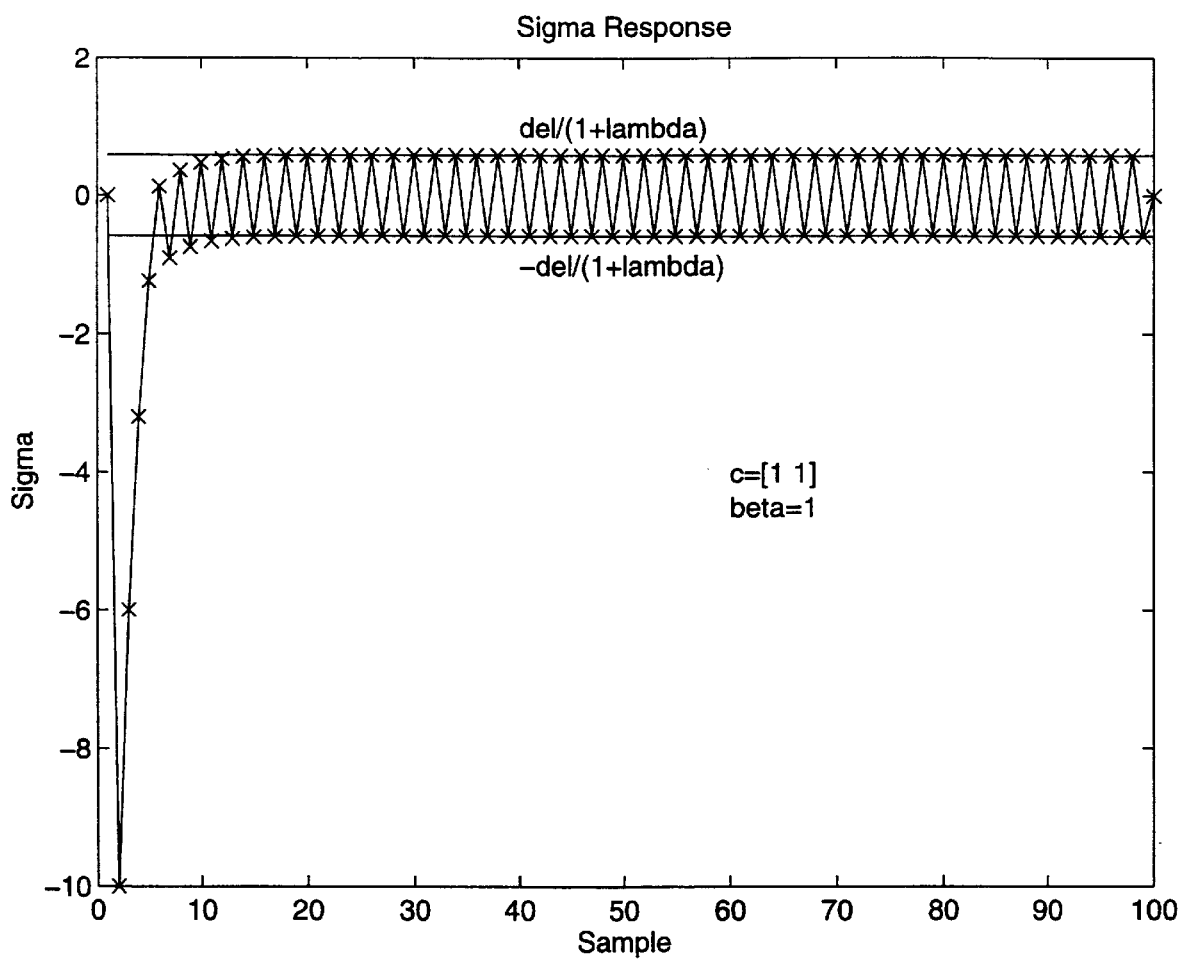
FIGS. 11A–11D illustrate the step response of the system for various values of plant gain.
Figure 11B:
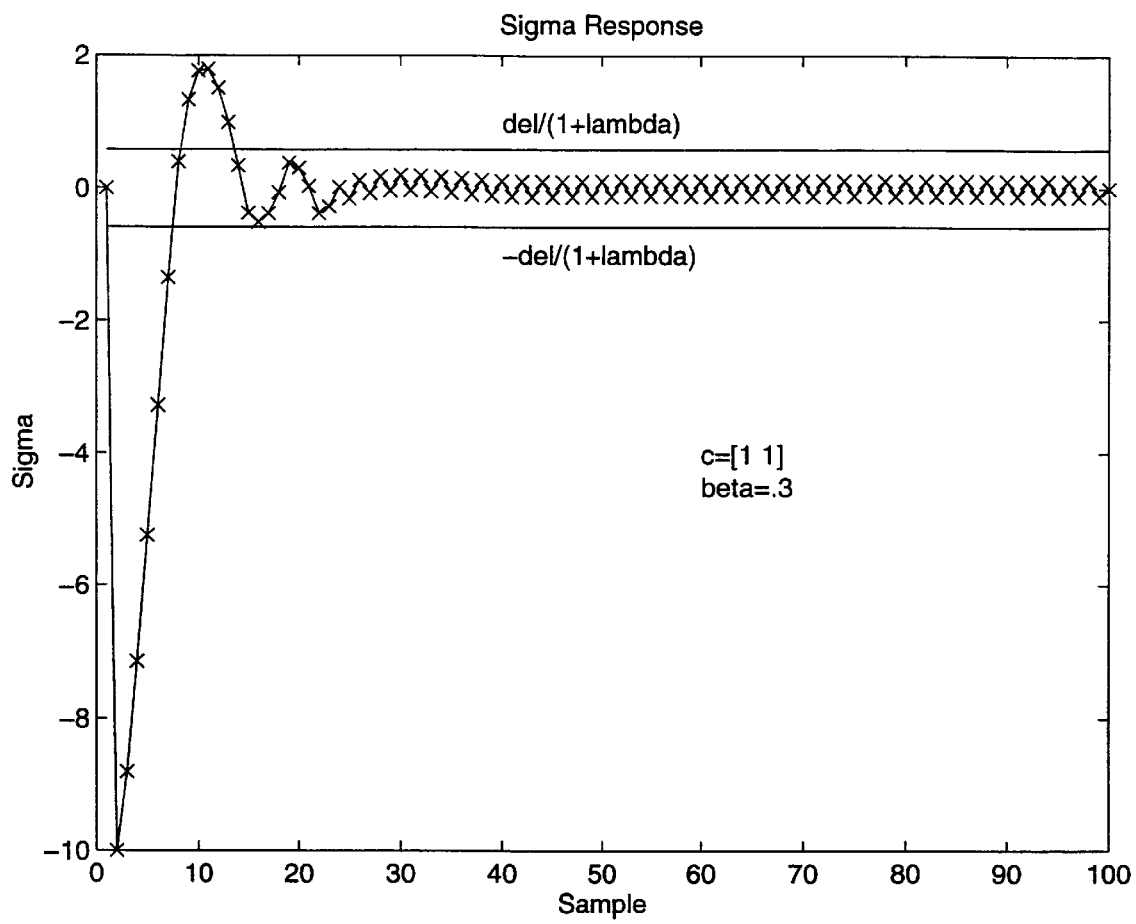
Figure 11C:
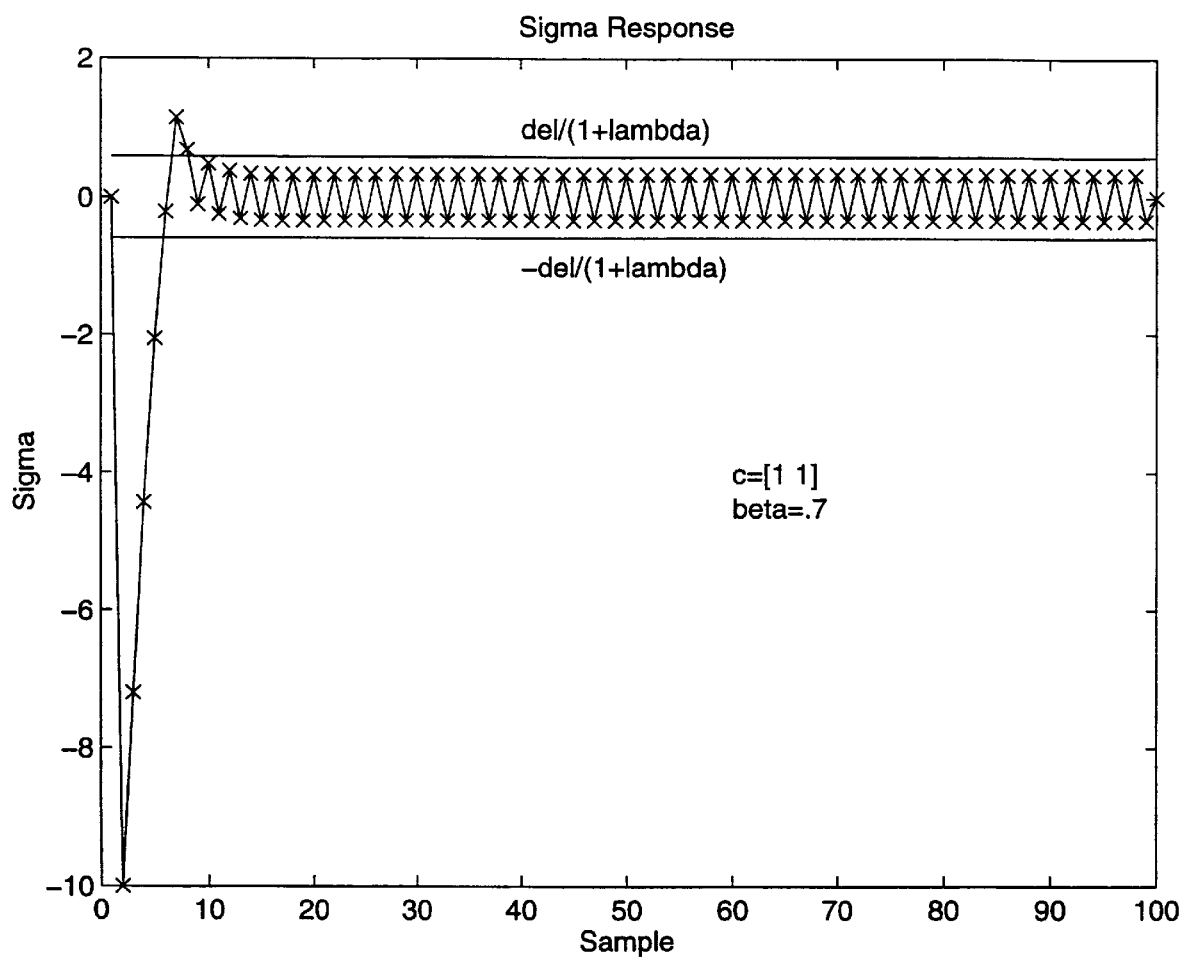
Figure 11D:
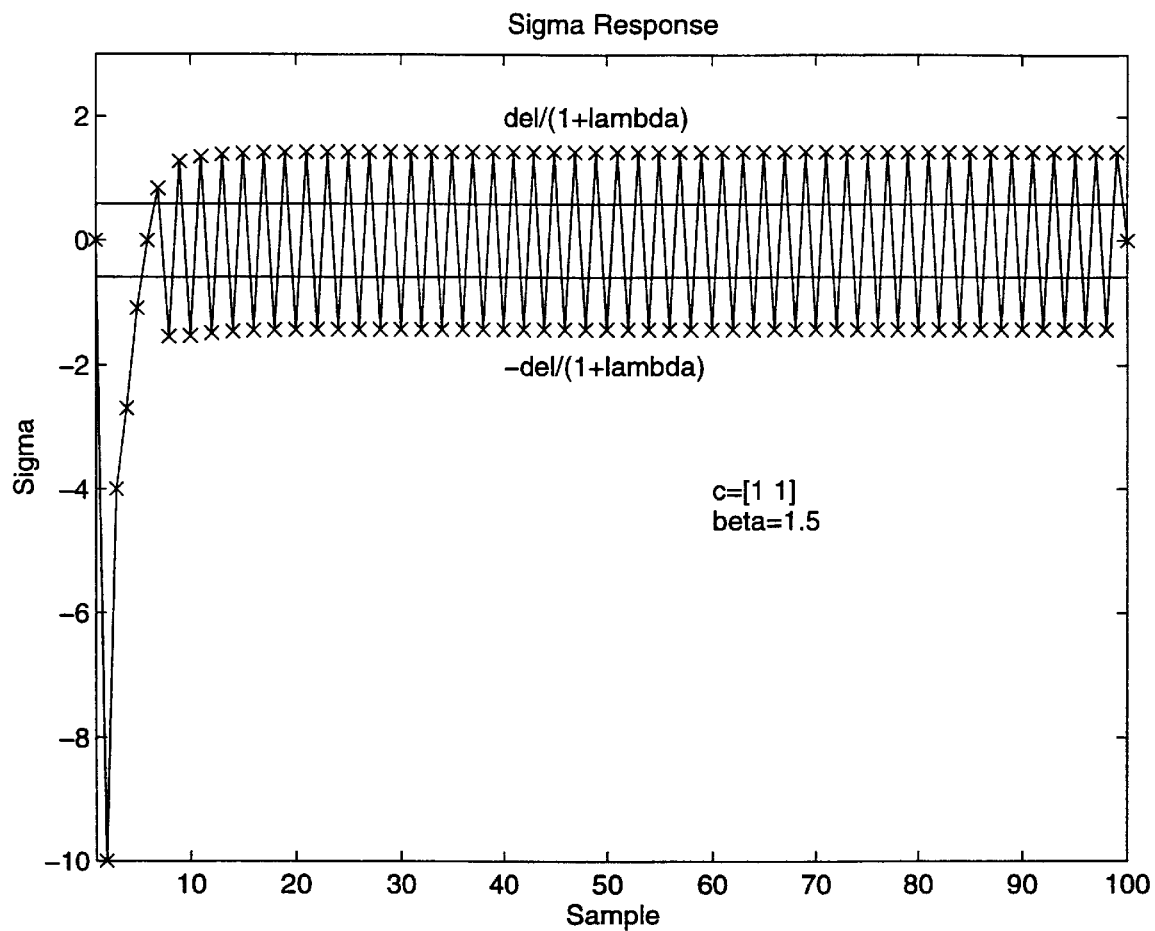

FIG. 10 shows the analytical solutions overlaid with the simulated values for $\sigma$ steady state. Note that for certain threshold values of $\beta$ less than one, the analytical solutions do not agree with the simulated values. These regions correspond to areas where the assumption of $\text{sgn}(\sigma_{k+1})=-\text{sgn}(\sigma_k)$ is violated and equation (37) is no longer valid. FIGS. 11A–11D show a series of step responses with varying plant gain (beta).

SUFFICIENT CONDITIONS FOR ZERO CROSSING

The assumption that a will cross the sliding line and change sign at every sample period depends on the values selected for the sliding mode variables c, $\lambda$ and $\Delta$, as well as the plant transfer function and gain variation $\beta$. The values which satisfy this condition can be determined from equations (31) and equation (34). From equation (34), the error for the regulator problem (R=0) at state k+n is $$\varepsilon_{k+n} = \Phi_0^n \varepsilon_k - \sum_{j=0}^{n-1} (\Phi_0^j B) sgn(\sigma_{k+n-j-1})$$

From equation (31), the error at state k+n+1 is $\epsilon_{k+n+1} = \Phi_0 \epsilon_{k+n} - B sgn(\sigma_{k+n})$.

Therefore, for $\sigma_{k+1}>0$ a sign change will occur at every sample period if $c\epsilon_{k+n+1}<0$ $c\Phi_0\epsilon_{k+n} - cB sgn(\sigma_{k+n})<0$ $c\Phi_0\epsilon_{k+n}<cB$.

A similar result can be derived for $\sigma_{k+1}<0$ resulting in the combined requirements of $$-cB < c\Phi_0 \epsilon_{k+n} < cB. \tag{38}$$

Equation (38) is valid for any location of a in the phase plane. Assuming equation (38) is satisfied such that a changes sign at every sample period, equation (38) can be written as $$-cB < c\Phi_0(I+\Phi_0)^{-1} < cB. \tag{39}$$

Expanding equation (38) using equation (34) and multiplying by $cB)^1$, equation (39) can be written as $$-1 < \lim_{n\to\infty} \left\{ c\Phi_0^{n+1}\varepsilon_k - c\sum_{j=1}^{n-1} \Phi_0^j B sgn(\sigma_{k+n-j-1}) \right\}(cB)^{-1} < 1 \tag{40}$$

Assuming that the initial condition term tends to zero, equation (40) can be written as $$-1 < \lim_{n\to\infty} c\{\Phi_0^1 B(sgn(\sigma_{k+n}) + \Phi_0^2 B(sgn(\sigma_{k+n+1}) + ...))\}(cB)^{-1} < 1 \tag{41}$$

If successive values are non-increasing, then the series in equation (41) will converge to a bounded value between zero and one. The conditions for assuring that $\sigma$ will cross the sliding line and change sign on every sample period is thus $$c\Phi_0^{j+1}B < c\Phi_0^j B \tag{42}$$

Figure 12:
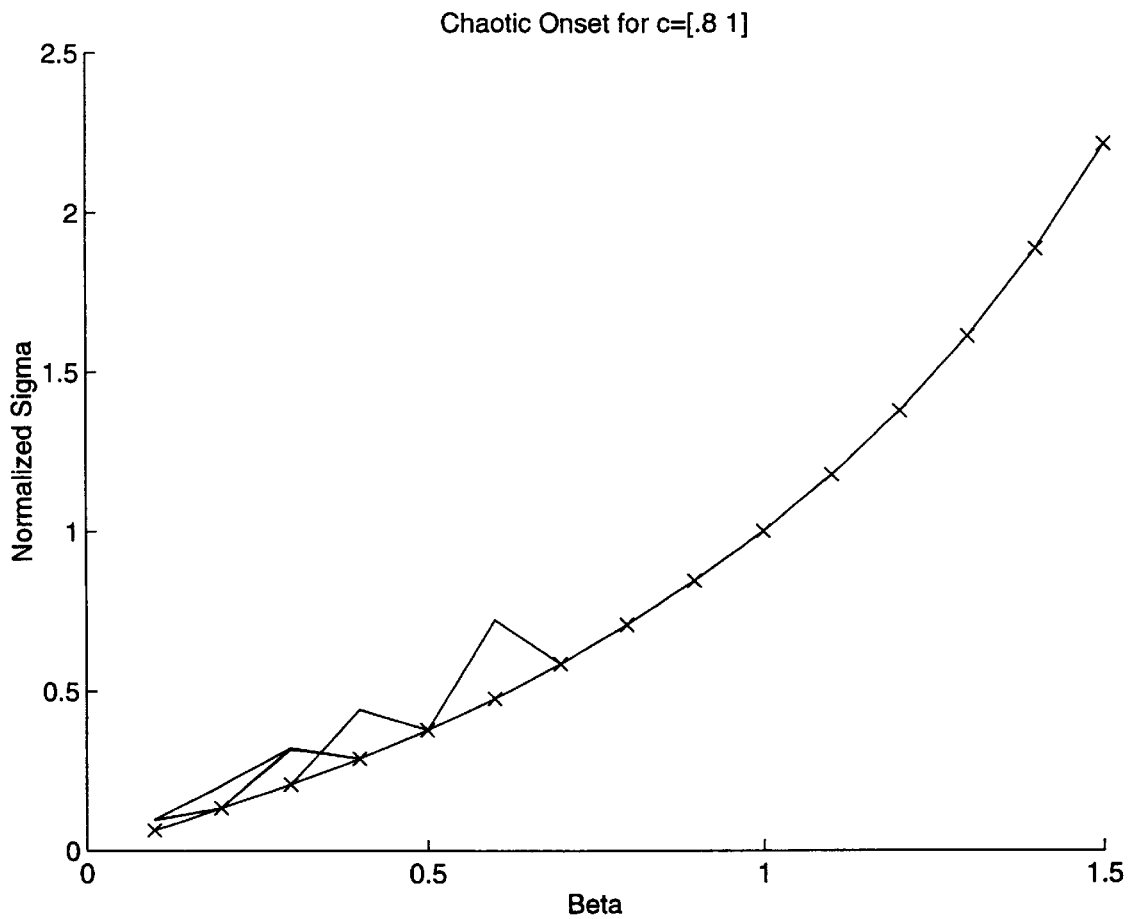
FIG. 12 is a plot illustrating chaotic onset of the discrete-time SMC where the sliding mode variable $\sigma_k$ does not cross the sliding line on successive s periods if the plant gain is too low.

FIG. 12 demonstrates equation (42) for a given system with c=[0.8 1] over a range of values for the plant gain (beta). When the plant gain $\beta$ falls below a certain threshold, equation (42) is violated and the system becomes chaotic. The region where equation (42) is violated is primarily a function of the sliding line c and the gain $\beta$. FIG. 12 illustrates that the analytical estimates of steady state behavior are lower bounds to the potential steady state behavior.

Figure 13:
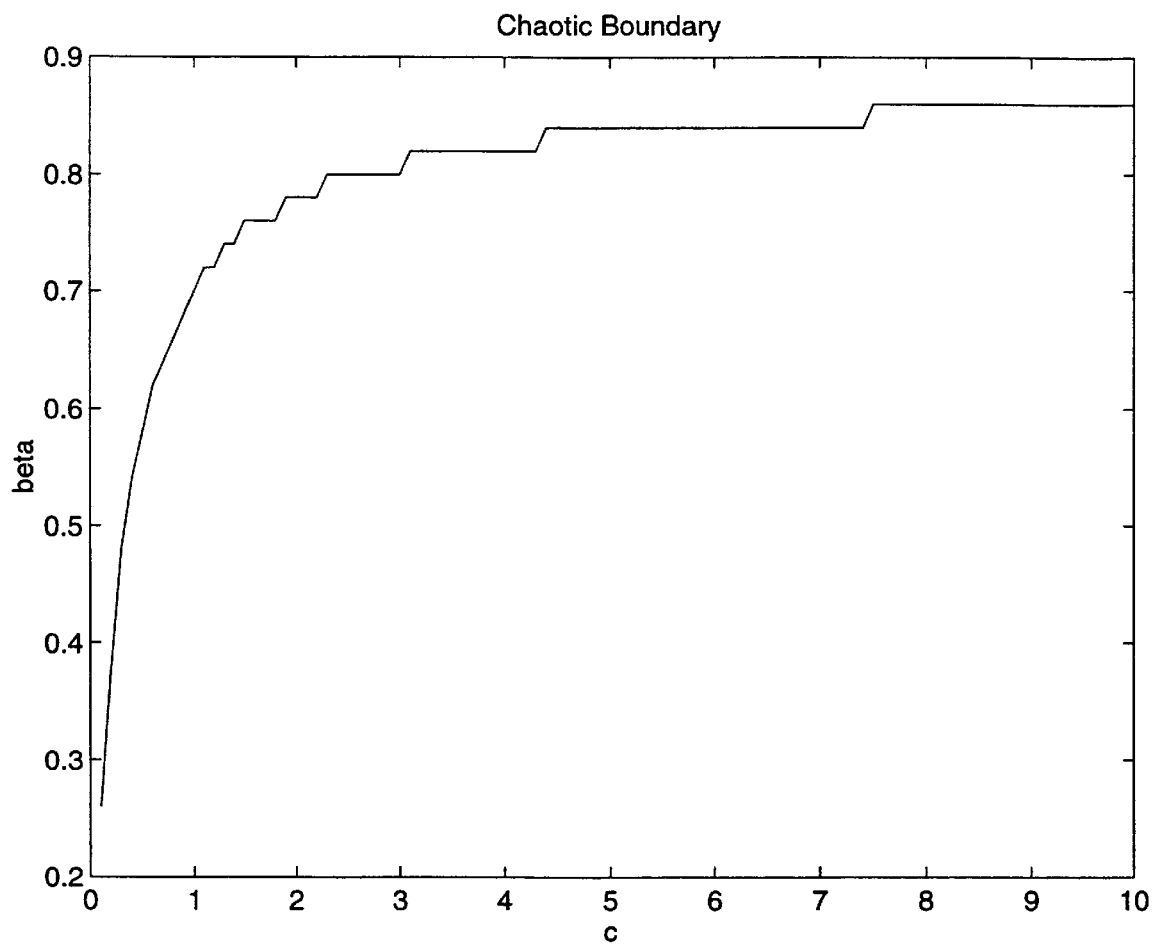
FIG. 13 is a plot of the chaotic boundary for various values of the slope of the sliding line c.

FIG. 13 shows the value of $\beta$ that delineates the chaotic boundary for each value of c.

Figure 14A:
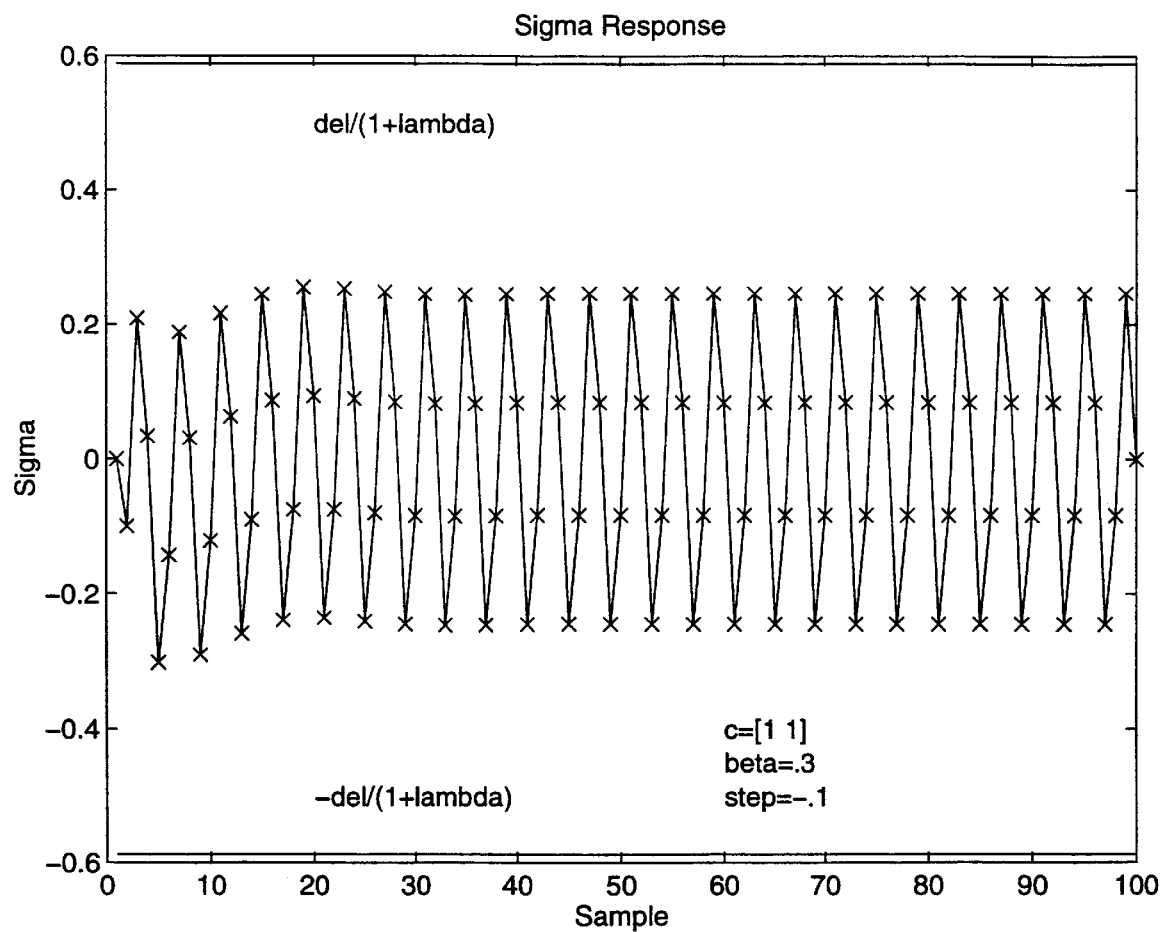
Figure 14B:
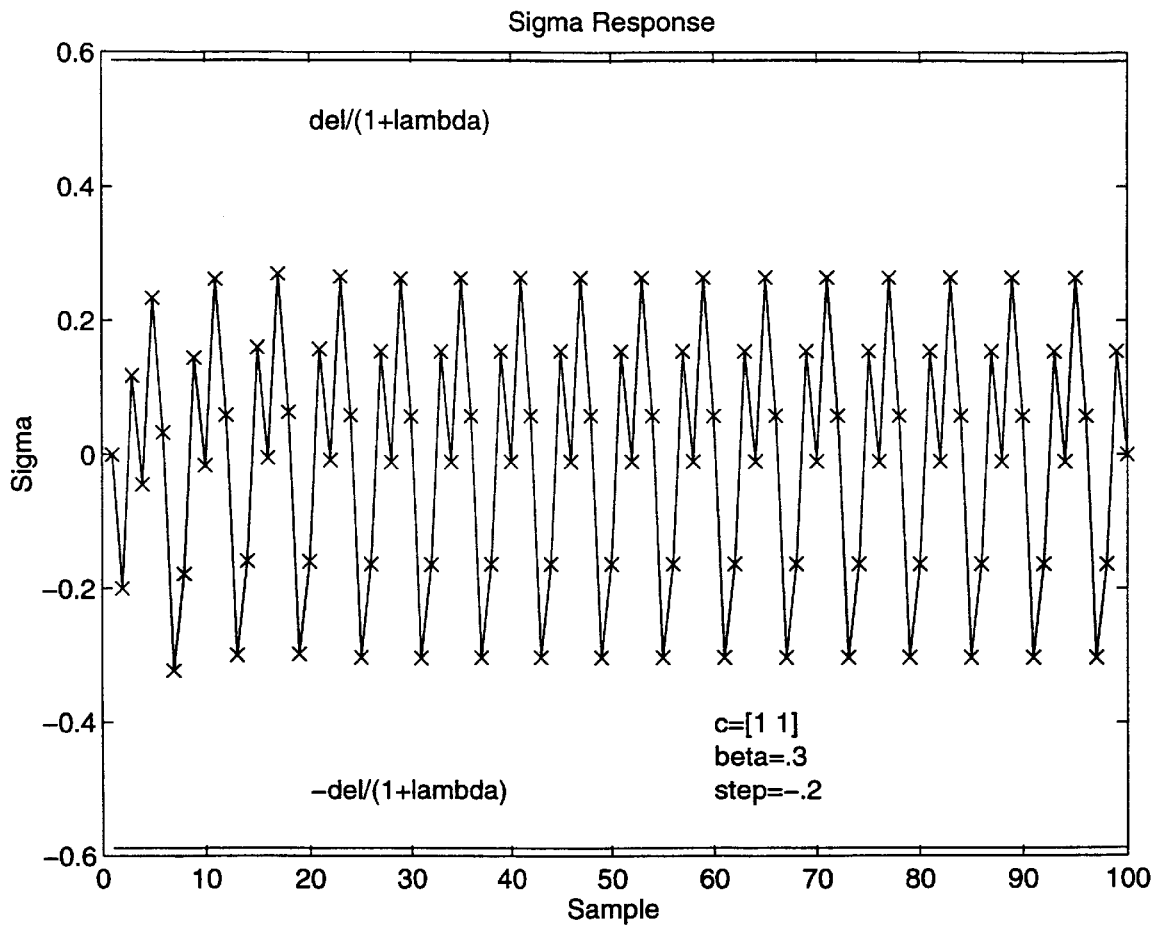
Figure 14C:
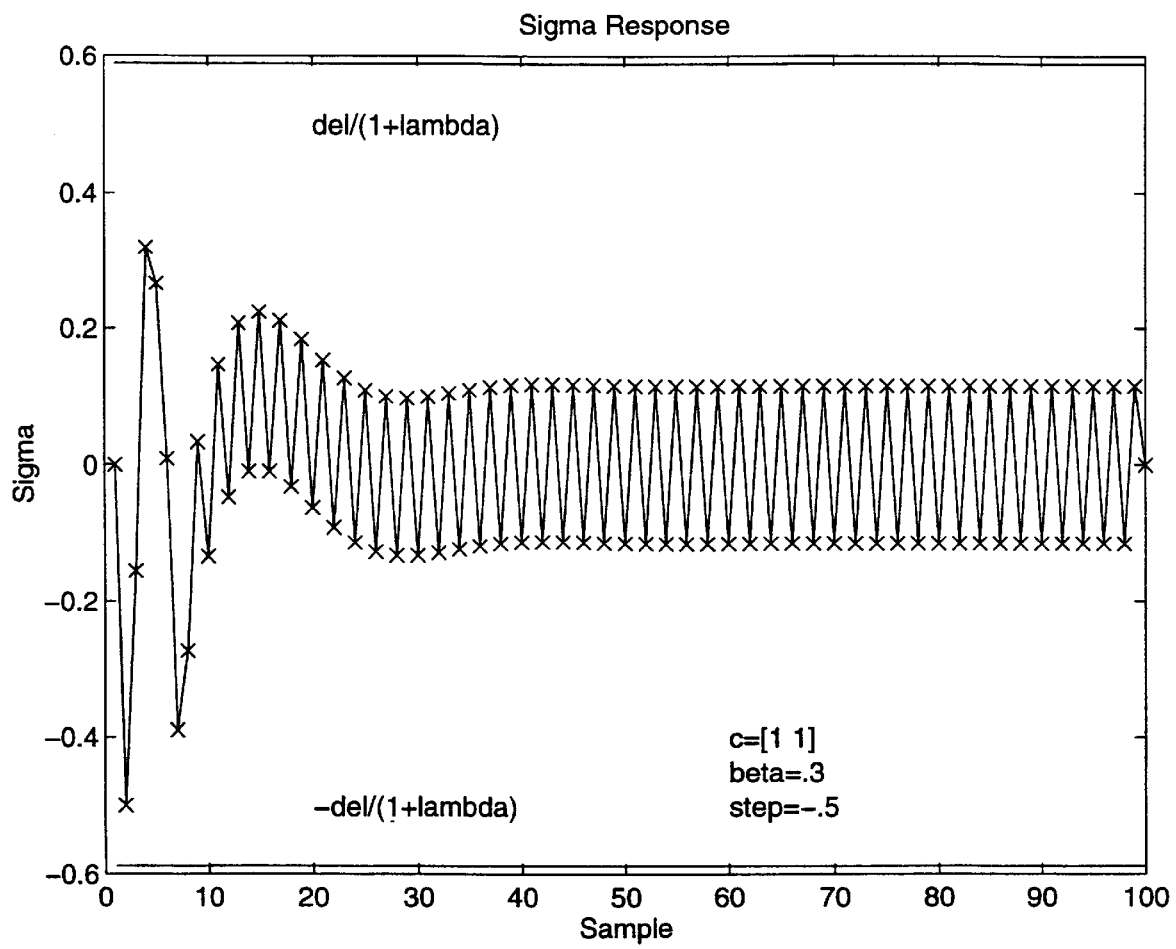

When equation (42) is violated and the system becomes chaotic, the steady state behavior will depend on the initial conditions of the system. It is possible that the steady state behavior, while stable, may be significantly different depending on initial conditions. FIGS. 14A–14C illustrate this by showing step responses of varying amplitudes while the system is in the chaotic region. Notice that in FIG. 14A and FIG. 14B when the amplitude of the step response is −0.1 and −0.2, $\sigma$ does not change sign on every sample period, whereas in FIG. 14C $\sigma$ does change sign on every sample period when the amplitude of the step response is −0.5.

EXTENSION TO THE SERVO PROBLEM

The above analysis of discrete-time sliding mode control applied to a regulator can be extended to a servo system having a non-zero reference signal. For $\sigma_{k+1}>0$, the above analysis with a non-zero reference signal leads to $c\epsilon_{k+n+1}<0$ $c\Phi_0\epsilon_{k+n} + cA(R_{k+n+1} - \Phi R_{k+n}) - cB sgn(\sigma_{k+n})<0$ $c\Phi_0\epsilon_{k+n} + cA(R_{k+n+1} - \Phi R_{k+n})<cB$.

A similar result can be derived for $\sigma_{k+1}<0$ resulting in the combined requirements of $$-cB < c\Phi_0\epsilon_{k+n} + cA(R_{k+n+1} - \Phi R_{k+n}) < cB. \tag{43}$$

Equation (43) is valid for all locations of $\sigma$ in the phase plane, and it does not require that steady state behavior be attained. For the specific case of steady state behavior where $\sigma$ crosses the sliding line and changes sign on every sample period, further simplification is possible $$\lim_{n\to\infty} \{c\Phi_0\varepsilon_{k+n} + cA(R_{k+n+1} - \Phi R_{k+n})\} =$$

$$\lim_{n\to\infty} \left\{ c\Phi_0^{n+1}\varepsilon_k - c\Phi_0 \sum_{j=0}^{n-1} \Phi_0^j A(R_{k+n-j} - \Phi R_{k+n-j-1}) \right\} +$$

$$(cA)(R_{k+n+1} - \Phi R_{k+n}) - \lim_{n\to\infty}\left\{ c\Phi_0 \sum_{j=0}^{n-1} \Phi_0^j B sgn(\sigma_{k+n-j-1}) \right\}$$

Combining terms and taking the limit of the initial condition term leads to $$\lim_{n\to\infty} \{c\Phi_0\varepsilon_{k+n} + cA(R_{k+n+1} - \Phi R_{k+n})\} = \tag{44}$$

$$\lim_{n\to\infty} \left\{ c\sum_{j=0}^{n-1} \Phi_0^j A(R_{k+n+1-j} - \Phi R_{k+n-j}) \right\} -$$

$$\lim_{n\to\infty}\left\{ c\Phi_0 \sum_{j=0}^{n-1} \Phi_0^j B sgn(\sigma_{k+n-j-1}) \right\}$$

From equations (35) and (36), the second term in equation (44) reduces to $c\Phi_0(I+\Phi_0)^{-1} B ssn(\sigma_k)$.

For the servo problem, the residual derivative term modulates the switching action of $\sigma$ Equation (43) then simplifies to $$-(cB + c\Phi_0(I+\Phi_0)^{-1}B) < \tag{45}$$

-continued $$\lim_{n\to\infty}\left\{c\sum_{j=0}^{n-1}\Phi_0^j A(R_{k+n+1-j}-\Phi R_{k+n-j})\right\} < (cB+c\Phi_0(I+\Phi_0)^{-1}B)$$

The magnitude of the middle term in equation (45) is more easily evaluated in the z domain $$\left|\lim_{n\to\infty}\left\{c\sum_{j=0}^{n-1}\Phi_0^j A(R_{k+n+1-j}-\Phi R_{k+n-j})\right\}\right| = \qquad(46)$$

$$|c(\Phi_0^0 A(zI-\Phi)R(z)+\Phi_0^1 z^{-1}A(zI-\Phi)R(z)+\Phi_0^2 z^{-2}A(zI-\Phi)R(z)+$$

$$\ldots)| = \left|c\left(\left(\frac{\Phi_0}{z}\right)^0+\left(\frac{\Phi_0}{z}\right)^1+\left(\frac{\Phi_0}{z}\right)^2+\ldots\right)A(zI-\Phi)R(z)\right| =$$

$$|cz(zI-\Phi_0)^{-1}A(zI-\Phi)R(z)|$$

where the geometric series in equation (46)

$$\left(\left(\frac{\Phi_0}{z}\right)^0+\left(\frac{\Phi_0}{z}\right)^1+\left(\frac{\Phi_0}{z}\right)^2+\ldots\right)$$

converges to
$z(zI-\Phi_0)^{-1}$.
The resulting bounds are therefore given as $$|cz(zI-\Phi_0)^{-1}A(zI-\Phi)R(z)|<2(cB+c\Phi_0(I+\Phi_0)^{-1}B) \qquad(47)$$

PSEUDO DERIVATIVE REFERENCE ESTIMATORS

Equations (24) is the pseudo derivative reference (PDR) $\Lambda_{k+1}$ and equations (25) and (26) set forth above disclose a technique for estimating the PDR $\Lambda_{k+1}$ in the control law of equation (23). This section describes various alternative embodiments for estimating the pseudo derivative reference $\Lambda_{k+1}$ through the use of a least-mean-square algorithm.

In general, servo systems can be divided into three categories: systems where the reference is known, such as in robotic systems; systems where the reference is unknown but repeatable, such as the runout signal in disk storage systems; and systems where the reference is unknown and non-repeatable. For the first type of systems where the reference is known, the pseudo derivative reference $\Lambda_{k+1}$ can be determined exactly from equation (22)

$$\Lambda_{k+1}=c(R_{k+1}-\Phi R_k)(c\Gamma)^{-1}.$$

For systems where the reference is unknown, the pseudo derivative reference $\Lambda_{k+1}$ must be estimated.

Figure 15A:
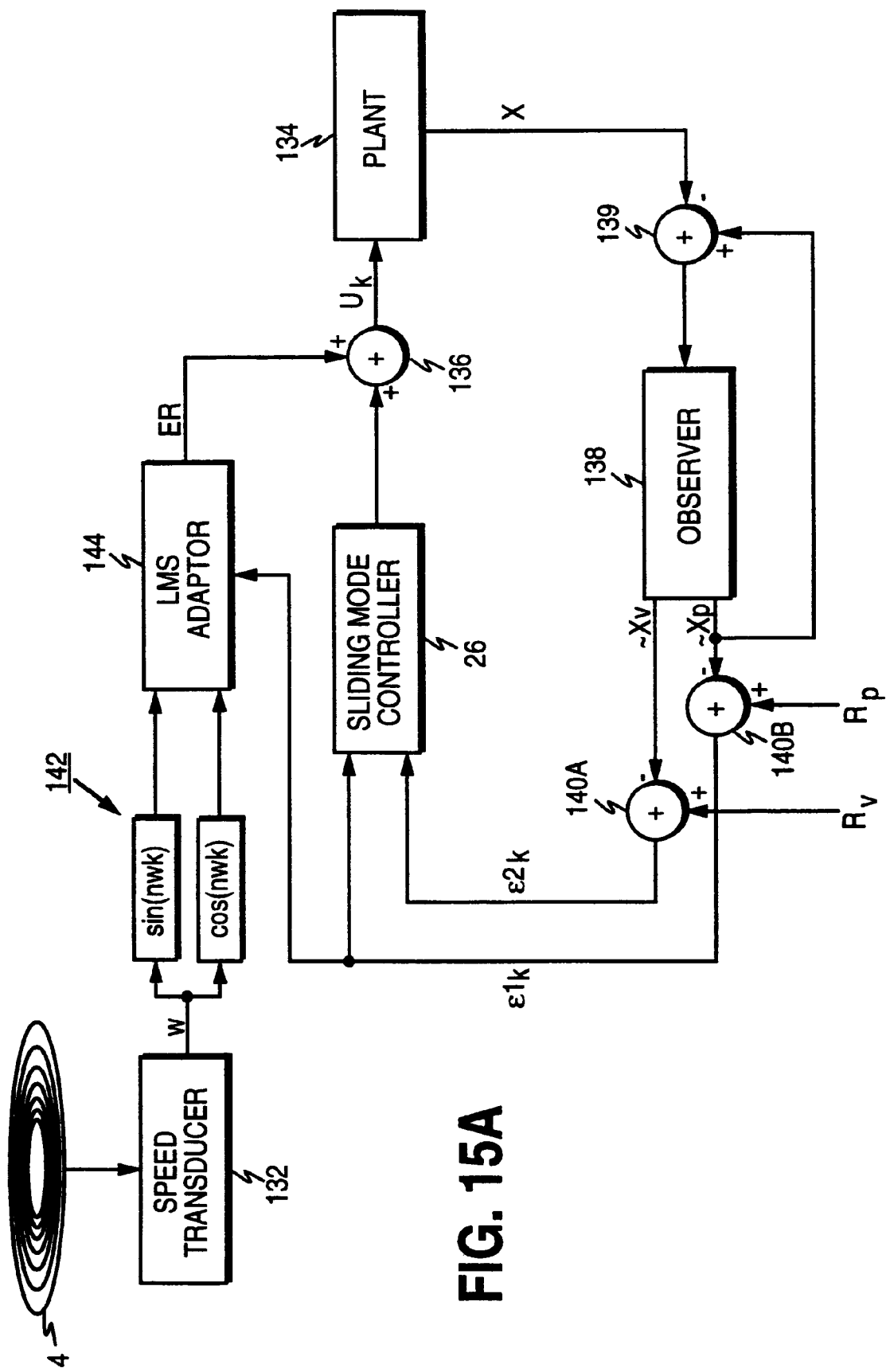
FIG. 15A shows a first embodiment for estimating the reference signal in a disk storage device by minimizing the position error phase state.

One embodiment for estimating the $\Lambda_{k+1}$ when the reference is unknown and repeatable is shown in FIG. 15A. In this example, the servo controller controls the motion of a read head in a disk storage system. The eccentricities of the disk storage medium 4 results in an unknown repeatable perturbation of the static reference signal 27 of FIG. 1. This perturbation is referred to as "runout" and is modelled as a noise signal 25 added 24 to the static reference signal 27 to generate the actual reference signal 18 for generating the position error phase state $\epsilon 1$ 22. References of this type are harmonic in nature and are related to the angular velocity of the disk. They can be modelled as $$R_k = \sum_{n=1}^{m} An_k \sin(nwk) + Bn_k \cos(nwk) \qquad(48)$$

where m is an integer greater than zero, the coefficients An and Bn are unknown, and w is the angular velocity of the disk 4 as determined from a speed transducer 132 (FIG. 15A).

Referring to FIG. 15A, the plant 134 represents the elements of the recording device (actuator, read head, spindle motor, read channel, etc.). The input to the plant 134 is a control signal $U_k$ generated by summing 136 the output of the sliding mode controller 26 (described above) and an estimated reference signal ER. The output of the plant is the measured position of the read head 6 relative to the surface of the disk 4. The detected angular velocity w is input into a sinusoid synthesizer 134 which synthesize sinusoidal signals (and harmonics) of the form in equation (48). An observer 138 estimates the non-measurable system phase states: the position phase state ~Xp and the velocity phase state ~Xv (or, alternatively, it may estimate the phase state errors). These phase states cannot be measured directly due to the effect of the unknown reference signal on these states. The input into the observer 138 is a position error generated by subtracting 139 the position signal X output by the plant 134 from the estimated position phase state ~Xp output by the observer 138. The estimated phase states ~Xp and ~Xv are subtracted from static reference signals Rp and Rv at adders 140A and 140B to generated a position error phase state $\epsilon 1_k$ and a velocity error phase state $\epsilon 2_k$. Alternatively, for many classes of systems the higher order error phase states, such as the velocity error phase state, may be estimated by taking the derivative of the position error phase state.

The coefficients An and Bn of equation (48) are estimated by minimizing the position error phase state $\epsilon 1^k$ using a least-mean-square (LMS) algorithm. A sinusoid synthesizer 142 synthesizes the sinusoidal signal (and harmonics) of equation (48) which are input into an LMS adaptor 144. The LMS adaptor processes the sinusoidal signals output by the synthesizer 142 and the position error phase state $\epsilon 1^k$ to compute the coefficients An and Bn of the estimated reference signal ER according to the following LMS algorithm $$ER_k = \sum_{n=1}^{m} An_k \sin(nwk) + Bn_k \cos(nwk)$$

$$An_{k+1} = An_k + g\varepsilon 1_k \sin(nwk)$$

$$Bn_{k+1} = Bn_k + g\varepsilon 1_k \cos(nwk)$$

where g is a predetermined gain constant. This technique minimizes the position error, but leaves a residual modulation on $\alpha/(1\lambda)$.

Adding the estimated reference ER to the control effort generated by the sliding mode controller 26 approximates the feed forward term $\Lambda_{k+1}$ of equation (23). Therefore, the hardware shown in FIG. 5B for generating $\Lambda_{k+1}$ is obviated.

Estimating the reference by minimizing the position error phase state $\epsilon 1^k$ will induce a residual modulation on the sliding mode variable $\sigma_k$ as it switches across the sliding line c. This is because the LMS algorithm reduces the error in the estimated reference at specific frequencies more than would be expected from the pseudo derivative reference term $\Lambda_{k+1}$ alone. If no further adaptation is required, this residual modulation is acceptable; however, it is possible to attenuate the modulation in $\sigma_k$ by minimizing the error in $\sigma_k$ rather than minimizing the position error phase state $\epsilon 1_k$. This embodiment of the present invention is understood with reference to FIG. 15B.

Figure 15B:
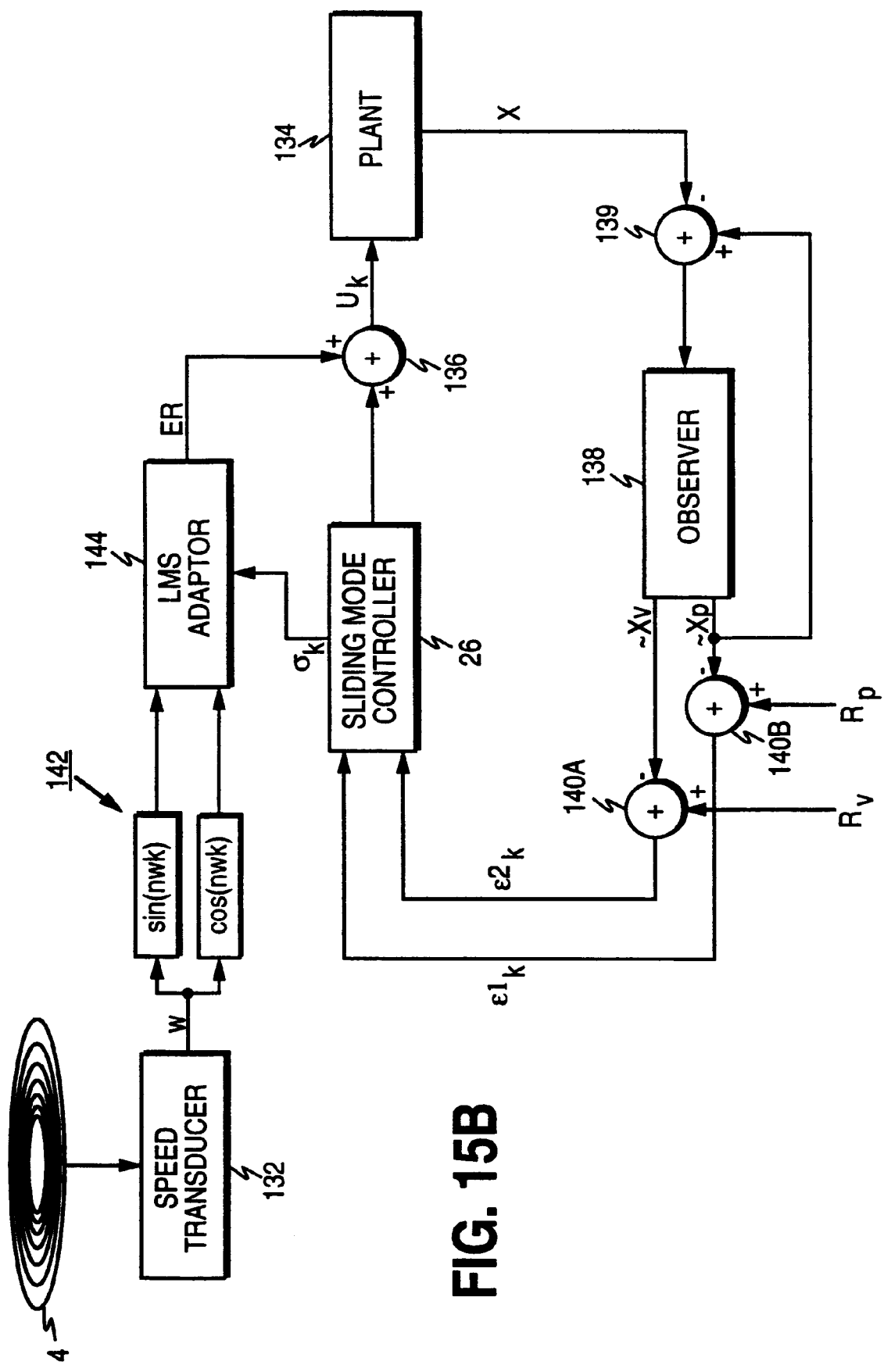
FIG. 15B shows an alternative embodiment for estimating the reference signal in a disk storage device by minimizing the deviation from nominal in the magnitude of the sliding mode variable $\sigma_k$.

FIG. 15B is essentially the same as FIG. 15A except that the LMS adaptor minimizes the error in $\sigma_k$ rather than the position error phase state $\epsilon 1_k$. Thus, the LMS algorithm becomes $$ER_k = \sum_{n=1}^{m} An_k \sin(nwk) + Bn_k \cos(nwk)$$

$$err_k = \sigma_k - sgn(\sigma_k)\frac{\Delta}{(1+\lambda)}$$

$$An_{k+1} = An_k + gerr_k \sin(nwk)$$

$$Bn_{k+1} = Bn_k + gerr_k \cos(nwk)$$

where the variables $\Delta$ an $\lambda$ determine the nominal switching boundary for $\sigma_k$ as described above with reference to the discrete-time sliding mode controller 26. This method increases the magnitude of the residual position error within specification, but it essentially eliminates the modulation in $\sigma_k$. In addition, it provides a better estimate of the pseudo derivative reference $\Lambda_{k+1}$ than does the LMS method of minimizing the position error phase state $\epsilon 1_k$.

Figure 15C:
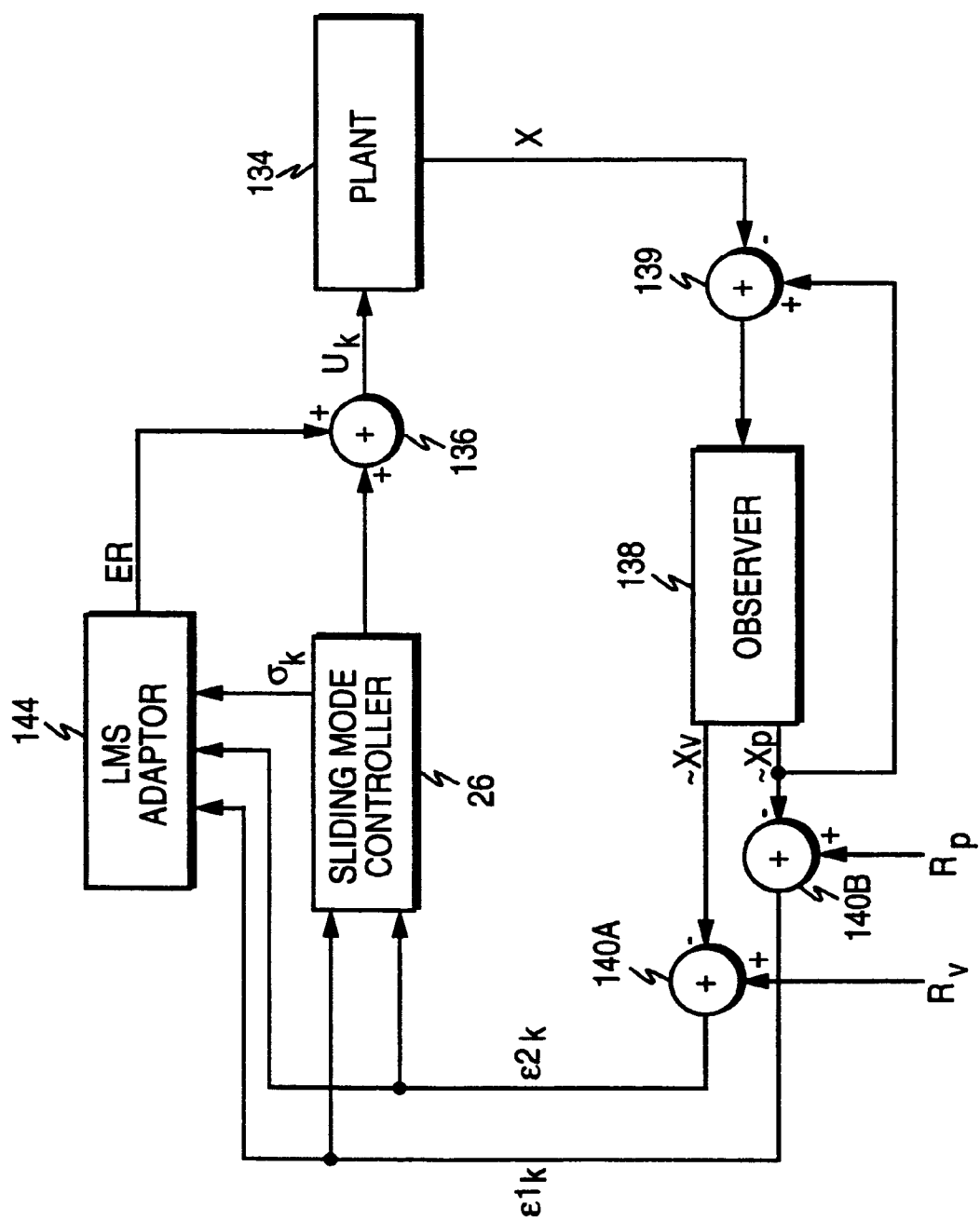
FIG. 15C illustrates a method for estimating an unknown, non-repeatable reference by minimizing the deviation from nominal in the magnitude of the sliding mode variable $\sigma_k$.

If the reference signal is completely unknown (non-repeatable), then the preferred method for estimating the reference is illustrated in FIG. 15C. This method enhances the estimate of the pseudo derivative reference $\Lambda_{k+1}$ described in equations (25) and (26) by taking the local derivative and adding it to the estimate yielding an increasingly better estimate of $\Lambda_{k+1}$ $$\Lambda_{k+1} \approx \Lambda_k$$
$$\Lambda_{k+1} \approx \Lambda_k + (\Lambda_k - \Lambda_{k-1})$$
$$\Lambda_{k+1} \approx A_k \Lambda_k + B_k (\Lambda_k - \Lambda_{k-1})$$

where A and B are unknown coefficients. This technique may be generalized to a predictor of m derivatives similar to the LMS algorithms described above. In general, a one step predictor is sufficient to minimize the modulation in $\sigma_k$. If, however, the reference has higher frequency components, then this technique is extensible to higher order derivatives. The LMS adaptor of FIG. 15C computes the coefficients A and B, and therefore the estimated reference signal ER, according to $$\Lambda_{k+1} = U_{k-1} - c\Phi(c\Gamma)^{-1}\varepsilon_{k-1} + \sigma_k(c\Gamma)^{-1}$$

$$err_k = \sigma_k - sgn(\sigma_k)\frac{\Delta}{(1+\lambda)}$$

$$A_{k+1} = A_k + g_0 err_k \Lambda_k$$

$$B_{k+1} = B_k + g_1 err_k (\Lambda_k - \Lambda_{k-1})$$

$$ER_k = A_k \Lambda_k - B_k (\Lambda_k - \Lambda_{k-1})$$

where $g_0$ and $g_1$ are predetermined gain constants. The above 17 algorithm uses the past error states $\epsilon_{k-1}$, the past control effort $U_{k-1}$, and the current value of $\sigma_k$ to generate the estimated reference signal ER. It does not require any a priori knowledge of the reference, and its convergence speed can be increased by increasing the convergence factors $g_0$ and $g_1$ ($g_1$ may be larger than $g_0$, corresponding to the slope of c).

Many changes in form and detail could be made without departing from the essential function of the present invention; the particular embodiments disclosed are not intended to be limiting. For instance, the discrete-time sliding mode controller may be implemented in hardware or software, and higher order phase states could be used in place of, or in addition to, the particular phase states disclosed. These and other modifications derived from the disclosed embodiment are within the intended scope of the present invention as properly construed from the following claims.

We claimed:

1. A discrete-time sliding mode controller for controlling the motion of a mechanical apparatus as part of a controlled system, the diserete-time sliding mode controller comprising:

(a) a phase state generator for generating a discrete-time phase state signal $X1_k$, the discrete-time phase state signal $X1_k$ comprising sample values occurring at a predetermined interval T;

(b) a linear signal generator, responsive to the discrete-time phase state signal $X1_k$, for generating a linear control signal;

a sliding mode signal generator, responsive to the discrete-time phase state signal $X1_k$, for generating a sliding mode control signal according to:
   $$\mu\Delta sgn(\sigma_k)$$
   where $\mu$ is a predetermined gain, $\Delta$ is a predetermined constant, $\sigma_k$ is a sliding mode variable computed from the discrete-time phase state signal $X1_k$, and y $sgn(\sigma_k)$ returns the sign of $\sigma_k$;

(d) a reference estimator for generating an estimated reference signal ER; and (e) a combiner for combining the linear control signal, the sliding mode control signal, and the estimated reference signal ER to generate a motion control signal $U_k$ for controlling the motion of a mechanical apparatus.

2. The discrete-time sliding mode controller as recited in claim 1, wherein the discrete-time phase state signal $X1_k$ is a position error phase state, and the reference estimator comprises:

(a) an angular velocity detector for detecting an angular velocity of a rotating device in the controlled system;

(b) a sinusoid synthesizer for generating a synthesized sinusoidal signal;

(c) a least-mean-square (LMS) adaptor for generating the estimated reference signal ER from the sinusoidal signal and the position error phase state $X1_k$.

3. The discrete-time sliding mode controller as recited in claim 2, wherein the LMS adaptor generates the estimated reference signal ER according to:

$$ER_k = \sum_{n=1}^{m} An_k \sin(nwk) + Bn_k \cos(nwk)$$

$$An_{k+1} = An_k + gX1_k \sin(nwk)$$

$$Bn_{k+1} = Bn_k + gX1_k \cos(nwk)$$

wherein:

(a) w represents the angular velocity of the rotating device in the controlled system;

(b) $An_k \sin(nwk) + Bn_k \cos(nwk)$ represents the sinusoidal signal;

(c) g is a predetermined gain constant; and (d) m is a predetermined integer greater than zero.

4. The discrete-time sliding mode controller as recited in claim 3, wherein:

(a) the linear signal generator generates the linear control signal according to:
   $$\Psi\epsilon_k$$

where $\Psi$ is a constant and $\epsilon_k$ is a discrete-time phase state error signal generated from the discrete-time phase state signal $X1_k$ and a reference signal $R_k$;

(b) the sliding mode signal generator generates the sliding mode control signal according to:

$\mu\Delta\,\text{sgn}(\sigma_k)$ where $\mu$ is a predetermined gain, $\Delta$ is a predetermined constant, $\sigma_k$ is a sliding mode variable computed from the discrete-time phase state signal $X1_k$, and $\text{sgn}(\sigma_k)$ returns the sign of $\sigma_k$; and (c) the combiner generates the motion control signal according to:

$\Psi\epsilon_k + \mu\Delta\,\text{sgn}(\sigma_k) + ER$.

5. The adaptive discrete-time sliding mode controller as recited in claim 3, wherein the sliding mode signal generator generates the sliding mode control signal according to:

$\mu\Delta\,\text{sgn}(\sigma_k)$ where $\mu$ is a predetermined gain, $\Delta$ is a predetermined constant, $\sigma_k$ is a sliding mode variable computed from the discrete-time phase state signal $X1_k$, and $\text{sgn}(\sigma_k)$ returns the sign of $\sigma_k$.

6. The adaptive discrete-time sliding mode controller as recited in claim 5, wherein the sliding mode variable $\sigma_k$ is computed according to:

$\sigma_k = c\epsilon_k$ where $\epsilon_k$ is a plurality of discrete-time phase state errors of the controlled system and c is a predetermined vector that defines a sliding line in a phase plane.

7. The adaptive discrete-time sliding mode controller as recited in claim 5, wherein the sliding mode variable $\sigma_k$ changes sign at substantially every sample index k.

8. The adaptive discrete-time sliding mode controller as recited in claim 7, wherein:

(a) the sliding mode variable $\sigma_k$ is substantially constrained to:

$-W < \sigma_k < +W$;

(b) W is a predetermined constant.

9. The adaptive discrete-time sliding mode controller as recited in claim 7, wherein the sliding mode variable $\sigma_k$ is substantially constrained to:

$\sigma_{k+1} = \lambda\sigma_k - \Delta\text{sgn}(\sigma_k)$ where $\lambda$ is a predetermined constant and $\lambda < 1$.

10. The adaptive discrete-time sliding mode controller as recited in claim 9, wherein the magnitude of the sliding mode variable $\sigma_k$ is substantially constrained to:

$|\sigma_k| \leq \Delta/(1+\lambda)$.

11. The adaptive discrete-time sliding mode controller as recited in claim 1, wherein the sliding mode variable $\sigma_k$ is computed according to:

$\sigma_k = c\epsilon_k$ where $\epsilon_k$ is a plurality of discrete time phase state errors of the controlled system and c is a predetermined vector that defines a sliding line in a phase plane.

12. The adaptive discrete-time sliding node controller as recited in claim 1, wherein the sliding mode variable $\sigma_k$ changes sign at substantially every sample index k.

13. The adaptive discrete-time sliding mode controller as recited in claim 12, wherein:

(a) the sliding mode variable $\sigma_k$ is substantially constrained to:

$-W < \sigma_k < +W$;

(b) W is a predetermined constant.

14. The adaptive discrete-time sliding mode controller as recited in claim 12, wherein the sliding mode variable $\sigma_k$ is substantially constrained to:

$\sigma_{k+1} = \lambda\sigma_k - \Delta\text{sgn}(\sigma_k)$ where X is a predetermined constant and $\lambda < 1$.

15. The adaptive discrete-time sliding mode controller as recited in claim 14, wherein the magnitude of the sliding mode variable $\sigma_k$ is substantially constrained to:

$|\sigma_k| \leq \Delta/(1+\lambda)$.

16. The discrete-time sliding mode controller as recited in claim 15, wherein the discrete-time phase state signal $X1_k$ is a position error phase state, and the reference estimator comprises:

(a) an angular velocity detector for detecting an angular velocity of a rotating device in the controlled system;

(b) a sinusoid synthesizer for generating a synthesized sinusoidal signal;

(c) a least-mean-square (LMS) adaptor for generating the estimated reference signal ER from the sinusoidal signal and the sliding mode variable $\sigma_k$.

17. The discrete-time sliding mode controller as recited in claim 16, wherein the LMS adaptor generates the estimated reference signal ER according to:

$$ER_k = \sum_{n=1}^{m} An_k \sin(nwk) + Bn_k \cos(nwk)$$

$$err_k = \sigma_k - sgn(\sigma_k)\frac{\Delta}{(1+\lambda)}$$

$$An_{k+1} = An_k + gerr_k \sin(nwk)$$

$$Bn_{k+1} = Bn_k + gerr_k \cos(nwk)$$

wherein:

(a) w represents the angular velocity of the rotating device in the controlled system;

(b) $An_k \sin(nwk) + Bn_k \cos(nwk)$ represents the sinusoidal signal;

(c) g is a predetermined gain constant; and (d) m is a predetermined integer greater than zero.

18. The adaptive discrete-time sliding mode controller as recited in claim 1, wherein;

(a) the sliding mode signal generator generates the sliding mode control signal according to:

$\mu\Delta\,\text{sgn}(\sigma_k)$ where $\mu$ is a predetermined gain, $\Delta$ is a predetermined constant, $\sigma_k$ is a sliding mode variable computed from the discrete-time phase state signal $X1_k$, and $\text{sgn}(\sigma_k)$ returns the sign of $\sigma_k$;

(b) $\sigma_k$ is computed according to:

$\sigma_k = c\epsilon_k$ where $\epsilon1_k$ is a plurality of discrete-time phase state errors of the controlled system and c is a predetermined vector that defines a sliding line in a phase plane;

(c) the sliding mode variable $\sigma_k$ is substantially constrained to:

$\sigma_{k+1} = \lambda \sigma_k - \Delta \text{sgn}(\sigma_k)$ where $\lambda$ is a predetermined constant and $\lambda < 1$;

(d) a plurality of discrete-time phase states $X_k$ of the controlled system are substantially modeled relative to the motor control signal $U_k$ according to:

$X_{k+1} = \Phi X_k + \Gamma U_k$ where $\Phi$ is a matrix and $\Gamma$ is a scalar;

(e) a pseudo derivative reference signal $\Lambda_{k+1}$ is computed according to:

$\Lambda_k = U_{k-1} - c\Phi(c\Gamma)^{-1}\epsilon_{k-1} + \sigma_k(c\Gamma)^{-1}$; and (f) $\epsilon_k$ is a discrete-time phase state error vector generated from the discrete-time phase states $X_k$ of the controlled system and a reference signal matrix $R_k$;

(g) the reference estimator comprises a least-mean-square (LMS) adaptor for generating the estimated reference signal ER according to:

$$err_k = \sigma_k - sgn(\sigma_k)\frac{\Delta}{(1\lambda)}$$

$$A_{k+1} = A_k + g_0 err_k \Lambda_k$$

$$B_{k+1} = B_k + g_1 err_k (\Lambda_k - \Lambda_{k-1})$$

$$ER_k = \Lambda_k \Lambda_k - B_k(\Lambda_k - \Lambda_{k-1})$$

wherein:

(i) w represents the angular velocity of a rotating device in the controlled system;

(ii) $A_k + B_k$ are coefficients; and (iii) $g_0$ and $g_1$ are a predetermined gain constants.

* * * * *